(12) United States Patent
Yoo et al.

(10) Patent No.: US 7,502,089 B2
(45) Date of Patent: Mar. 10, 2009

(54) LIQUID CRYSTAL DISPLAY

(75) Inventors: Seung-Hoo Yoo, Seongnam-si (KR); Jong-Ho Son, Seoul (KR); Hee-Wook Do, Suwon-si (KR); Hyun-Wuk Kim, Yongin-si (KR); Hak-Sun Chang, Yongin-si (KR); Yoon-Sung Um, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 110 days.

(21) Appl. No.: 11/485,579

(22) Filed: Jul. 12, 2006

(65) Prior Publication Data

US 2007/0013854 A1 Jan. 18, 2007

(30) Foreign Application Priority Data

Jul. 15, 2005 (KR) .................. 10-2005-0064488

(51) Int. Cl.
G02F 1/1343 (2006.01)
(52) U.S. Cl. .................. 349/143; 349/145; 349/146
(58) Field of Classification Search .......... 349/143, 349/145, 146
See application file for complete search history.

(56) References Cited

U.S. PATENT DOCUMENTS

| 6,256,081 | B1 * | 7/2001 | Lee et al. ............... 349/141 |
| 6,512,565 | B1 * | 1/2003 | Lee et al. ............... 349/130 |
| 6,577,366 | B1 * | 6/2003 | Kim et al. ............... 349/139 |
| 6,642,984 | B1 * | 11/2003 | Yoshida et al. ........... 349/139 |
| 6,680,772 | B2 | 1/2004 | Lee |
| 7,177,002 | B2 * | 2/2007 | Matsumoto et al. ......... 349/141 |
| 2003/0043098 | A1 * | 3/2003 | Aoyama et al. .............. 345/87 |
| 2003/0202145 | A1 * | 10/2003 | Takizawa et al. ........... 349/129 |
| 2004/0046915 | A1 * | 3/2004 | Takeda et al. .............. 349/129 |
| 2004/0169777 | A1 * | 9/2004 | Tanaka et al. ............. 349/39 |
| 2004/0201811 | A1 * | 10/2004 | Jun ..................... 349/146 |
| 2005/0024572 | A1 | 2/2005 | Tak |
| 2005/0099573 | A1 * | 5/2005 | Kubo et al. .............. 349/146 |
| 2005/0243259 | A1 * | 11/2005 | Song et al. ................. 349/143 |
| 2006/0050220 | A1 * | 3/2006 | Matsumoto et al. ......... 349/143 |
| 2007/0132929 | A1 * | 6/2007 | Kataoka et al. ............ 349/123 |
| 2008/0055528 | A1 * | 3/2008 | Sasaki et al. ............. 349/139 |
| 2008/0074602 | A1 * | 3/2008 | Arai et al. ............... 349/146 |

FOREIGN PATENT DOCUMENTS

| JP | 2000-131781 | 5/2002 |
| JP | 2002-156642 | 5/2002 |
| JP | 2003-066482 | 3/2003 |
| JP | 2004-341526 | 12/2004 |
| JP | 2005-025202 | 1/2005 |

(Continued)

Primary Examiner—K. Cyrus Kianni
(74) Attorney, Agent, or Firm—F. Chau & Assoc., LLC

(57) ABSTRACT

A liquid crystal display includes: a substrate; a pixel electrode disposed on the substrate and having a first subpixel electrode and a second subpixel electrode; and a common electrode facing the pixel electrode, wherein the first subpixel electrode has a pair of bent edges substantially parallel to each other, the second subpixel electrode has a pair of bent edges substantially parallel to each other, and the second subpixel electrode has a height greater than a height of the first subpixel electrode.

8 Claims, 23 Drawing Sheets

FOREIGN PATENT DOCUMENTS

| | | |
|---|---|---|
| JP | 2005-055897 | 3/2005 |
| KR | 1020020020457 | 3/2002 |
| KR | 10-0348288 | 7/2002 |
| KR | 1020020056725 | 7/2002 |
| KR | 10-0372577 | 2/2003 |
| KR | 1020030023480 | 3/2003 |
| KR | 10-0393642 | 7/2003 |
| KR | 1020030058340 | 7/2003 |
| KR | 1020040016470 | 2/2004 |
| KR | 1020040043485 | 5/2004 |
| KR | 1020050003262 | 1/2005 |
| KR | 1020050009040 | 1/2005 |
| KR | 1020050010138 | 1/2005 |
| KR | 1020050014414 | 2/2005 |

* cited by examiner

LIQUID CRYSTAL DISPLAY

CROSS-REFERENCE TO RELATED APPLICATION

This Application claims priority from a Korean patent application number 10-2005-0064488 filed on Jul. 15, 2005, and all the benefits accruing therefrom under 35 U.S.C. §119, the contents of which are incorporated by reference herein in its entirety.

BACKGROUND OF THE INVENTION (a) Technical Field

The present disclosure relates to a liquid crystal display.

(b) Discussion of Related Art

A liquid crystal display (LCD) is one of the most widely used flat panel display devices. The LCD includes a pair of panels including field-generating electrodes such as pixel electrodes and a common electrode, and a liquid crystal (LC) layer interposed between the panels. The LCD generates an electric field in the LC layer by applying voltages to the electrodes, and obtains desired images by controlling the strength of the electric field for determining orientations of LC molecules and polarization of light incident on the LC layer to vary the transmittance of light incident on the LC layer.

The LCD further includes switching elements connected to the pixel electrodes and signal lines such as gate lines and data lines, for applying signals to the switching elements, thereby applying voltages to the pixel electrodes.

Among the LCDs, a vertical alignment (VA) mode LCD, which aligns LC molecules such that the long axes of the LC molecules are perpendicular to the panels in the absence of an electric field, is spotlighted because of its high contrast ratio and wide reference viewing angle. The reference viewing angle means a viewing angle where the contrast ratio is 1:10 or the luminance sequence of grays starts to be reversed.

The wide viewing angle of the VA mode LCD can be realized by cutouts in the field-generating electrodes and protrusions on or under the field-generating electrodes. Since the cutouts and the protrusions can determine the tilt directions of the LC molecules, the tilt directions can be distributed into several directions by using the cutouts and the protrusions so to widen the reference viewing angle.

However, the protrusions and the cutouts obstruct the transmission of incident light and, thus, the light transmittance decreases as the number of the protrusions or the cutouts increases. In order to increase the light transmittance, the area of the pixel electrodes is suggested to be enlarged. However, the suggested configuration makes adjacent pixel electrodes close and makes the pixel electrodes and the data lines adjacent thereto close such that strong lateral electric fields are generated near the edges of the pixel electrodes. The lateral electric fields disorder the orientations of the LC molecules to generate visible texture in the image, as well as light leakage.

In addition, the VA mode LCD has poor lateral visibility as compared with front visibility. For example, in a conventional LCD provided with cutouts, the image becomes brighter toward the lateral edges of the LCD and, in a severe case, the luminance difference between high grays vanishes to make the overall image dim.

To improve the lateral visibility, a pixel is divided into two subpixels capacitively coupled to each other. One of the two subpixels is directly supplied with a voltage, while the other is subjected to a voltage drop by the capacitive coupling, such that the two subpixels have different voltages to result in different light transmittances.

SUMMARY OF THE INVENTION

A liquid crystal display according to an exemplary embodiment of the present invention includes: a first substrate; a second substrate; a plurality of first signal lines formed at the first substrate; a plurality of second signal lines formed at the first substrate; a first subpixel electrode formed at the first substrate and having a bent edge; a second subpixel electrode formed at the first substrate, having a bent edge, and disposed adjacent to the first subpixel electrode in a first direction; a third subpixel electrode formed at the first substrate, having a bent edge, and disposed adjacent to the second subpixel electrode in a second direction; a fourth subpixel electrode formed at the first substrate, having a bent edge, and disposed adjacent to the third subpixel electrode in the first direction and to the first subpixel electrode in the second direction; a common electrode formed at the second substrate and facing the first to the fourth subpixel electrodes; and a plurality of switching elements, each of the switching elements coupled to one of the first signal lines, one of the second signal lines, and one of the first to the fourth subpixel electrodes, wherein the bent edge of the second subpixel electrode is longer than the bent edge of the first subpixel electrode, the bent edge of the fourth subpixel electrode is longer than the bent edge of the third subpixel electrode, and the fourth subpixel electrode has an edge contacting an edge of the second subpixel electrode.

First-directional lengths of the first to the fourth subpixel electrodes may be substantially equal to each other, and a length of the bent edge of each of the second and the fourth subpixel electrodes may be about twice a length of the bent edge of each of the first and the third subpixel electrodes.

The liquid crystal display may further include a tilt direction determining member formed at the common electrode. The tilt direction determining member may include a cutout having a bent portion passing through one of the first to the fourth subpixel electrodes and extending substantially parallel to the bent edge of the one of the first to the fourth subpixel electrodes. A distance between the bent portion of the cutout and the bent edge of the one of the first to the fourth subpixel electrodes may be equal to about 20-35 microns.

The first subpixel electrode and the second or the fourth subpixel electrode may be supplied with different voltages obtained from a single image information.

The switching elements may include a first thin film transistor coupled to the first subpixel electrode, and a second thin film transistor coupled to the second or the fourth subpixel electrode, and the first and the second thin film transistors may be connected to two different ones of the first signal lines and to a single one of the second signal lines.

The first and the second thin film transistors may turn on to transmit signals from the single one of the second signal lines in response to signals from the two different ones of the first signal lines, or may turn on to transmit signals from the different two of the first signal lines in response to a signal from the single one of the second signal lines.

A liquid crystal display according to an exemplary embodiment of the present invention includes: a substrate; a pixel electrode disposed on the substrate and comprising a first subpixel electrode and a second subpixel electrode; and a common electrode facing the pixel electrode, wherein the first subpixel electrode has a pair of bent edges substantially parallel to each other, the second subpixel electrode has a pair of bent edges substantially parallel to each other, and the second subpixel electrode has a height greater than a height of the first subpixel electrode.

The first subpixel electrode and the second subpixel electrode may be adjacent in a length direction or in a height direction. In the latter case, the convexity and the concavity of the bent edges of the first and the second subpixel electrodes may be reversed relative to each other.

The first subpixel electrode may have a length substantially equal to a length of the second subpixel electrode, and the height of the second subpixel electrode may be about twice the height of the first subpixel electrode.

Each of the bent edges may have a bent point, and each of the first and the second subpixel electrodes may have a symmetry with respect to a straight line connecting the bent points.

The pair of bent edges may include a concave edge and a convex edge.

The convex edge of the first subpixel electrode may be adjacent the concave edge of the second subpixel electrode or the concave edge of the first subpixel electrode may be adjacent the convex edge of the second subpixel electrode. Otherwise, the concave edge of the first subpixel electrode may be connected to the convex edge of the second subpixel electrode, and the convex edge of the first subpixel electrode may be connected to the concave edge of the second subpixel electrode.

The liquid crystal display may further include a tilt direction determining member formed at the common electrode. The tilt direction determining member may include a cutout including a bent portion passing through the first or the second subpixel electrode and extending substantially parallel to the bent edges of the first or the second subpixel electrode. A distance between the bent portion of the cutout and one of the bent edges of the first or the second subpixel electrodes adjacent the bent portion may be equal to about 20-35 microns.

The first subpixel electrode and the second subpixel electrode may have different voltages, and the first subpixel electrode and the second subpixel electrode may be supplied with different voltages obtained from a single image information.

The liquid crystal display may further include: a first thin film transistor coupled to the first subpixel electrode; a second thin film transistor coupled to the second subpixel electrode; a first signal line coupled to the first thin film transistor; a second signal line coupled to the second thin film transistor; and a third signal line coupled to the first and the second thin film transistors and intersecting the first and the second signal lines.

The first thin film transistor may turn on to transmit a signal from the third signal line in response to a signal from the first signal line, and the second thin film transistor may turn on to transmit a signal from the third signal line in response to a signal from the second signal line. At this time, the first thin film transistor and the second thin film transistor may be disposed opposite each other with respect to the third signal line.

Otherwise, the first thin film transistor may turn on to transmit a signal from the first signal line in response to a signal from the third signal line, and the second thin film transistor may turn on to transmit a signal from the second signal line in response to a signal from the third signal line.

The liquid crystal display may further include a fourth signal line extending in a straight line connecting bent points of the bent edges of the first and the second subpixel electrodes. Each of the first and the second thin film transistors may include a drain electrode overlapping the fourth signal line.

The first subpixel electrode and the second subpixel electrode may be capacitively coupled to each other. The liquid crystal display may further include: a thin film transistor coupled to the first subpixel electrode; a first signal line coupled to the thin film transistor; and a second signal line coupled to the thin film transistor and intersecting the first signal line.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

Exemplary embodiments of the present invention now will be described more fully hereinafter with reference to the accompanying drawings. The present invention may, however, be embodied in many different forms and should not be construed as limited to the embodiments set forth herein.

An LCD according to an exemplary embodiment of the present invention will be described in detail with reference to FIGS. 1 and 2.

Figure 1:
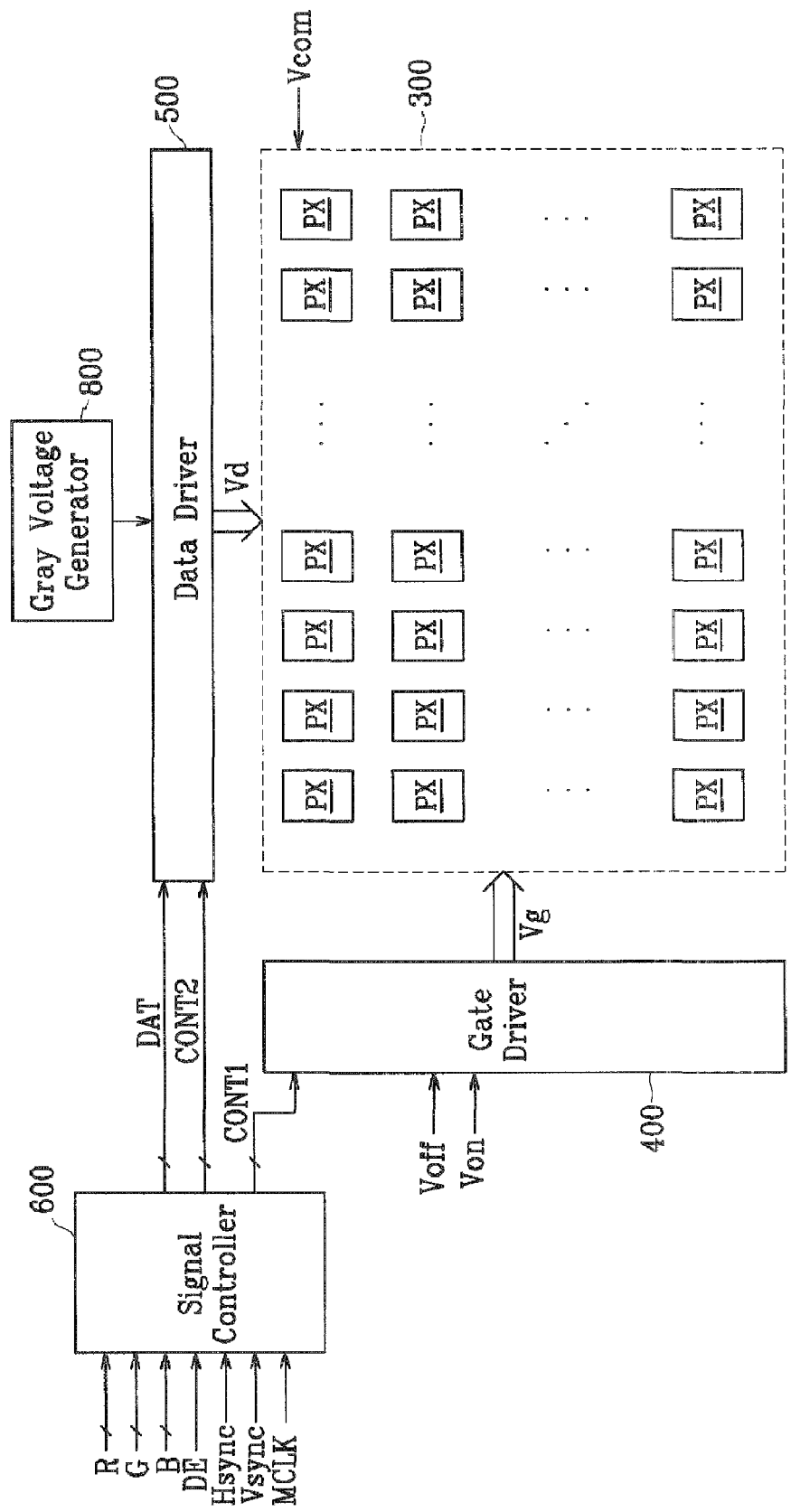
FIG. 1 is a block diagram of an LCD according to an exemplary embodiment of the present invention.
Figure 2:
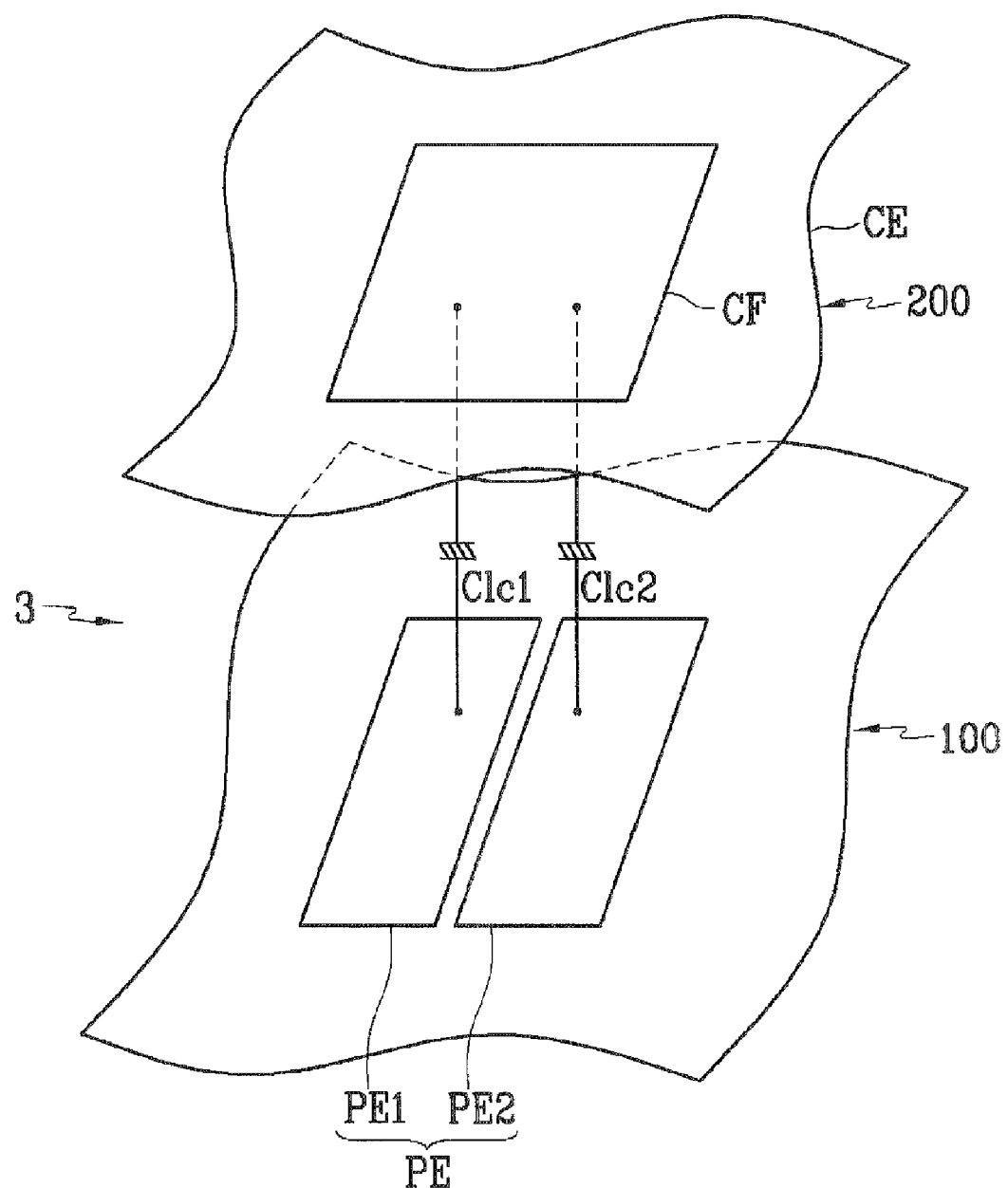
FIG. 2 is an equivalent circuit diagram of a pixel of an LCD according to an exemplary embodiment of the present invention.

FIG. 1 is a block diagram of an LCD according to an exemplary embodiment of the present invention, and FIG. 2 is an equivalent circuit diagram of a pixel of an LCD according to an exemplary embodiment of the present invention.

Referring to FIG. 1, an LCD according to an exemplary embodiment includes an LC panel assembly 300, a gate driver 400 and a data driver 500 that are connected to the panel assembly 300, a gray voltage generator 800 connected to the data driver 500, and a signal controller 600 controlling the above elements.

Referring to FIG. 1, the panel assembly 300 includes a plurality of signal lines (not shown) and a plurality of pixels PX connected thereto and arranged substantially in a matrix. In a structural view shown in FIG. 2, the panel assembly 300 includes a lower panel 100, an upper panel 200, and an LC layer 3 interposed therebetween.

The signal lines, which are provided on the lower panel 100, include a plurality of gate lines (not shown) transmitting gate signals, also referred to as "scanning signals", and a plurality of data lines (not shown) transmitting data signals. The gate lines extend substantially in a row direction and are substantially parallel to each other, while the data lines extend substantially in a column direction and are substantially parallel to each other.

Referring to FIG. 2, each pixel PX includes a pair of subpixels and each subpixel includes a liquid crystal (LC) capacitor Clc1/Clc2. At least one of the two subpixels further includes a switching element (not shown) connected to a gate line, a data line, and an LC capacitor Clc1/Clc2.

The LC capacitor Clc1/Clc2 includes a subpixel electrode PE1/PE2 provided on the lower panel 100 and a common electrode CE provided on the upper panel 200 as two terminals. The LC layer 3 disposed between the electrodes PE1/PE2 and CE functions as the dielectric of the LC capacitor Clc1/Clc2. A pair of subpixel electrodes PE1 and PE2 are separated from each other and form a pixel electrode PE. The common electrode CE is supplied with a common voltage Vcom and covers an entire surface of the upper panel 200. The LC layer 3 has negative dielectric anisotropy, and LC molecules in the LC layer 3 may be oriented so that long axes of the LC molecules are perpendicular to the surfaces of the panels 100 and 200 in the absence of an electric field.

For a color display, each pixel PX uniquely represents one of the primary colors, that is, spatial division, or each pixel PX sequentially represents the primary colors in turn, that is, temporal division, such that the spatial or temporal sum of the three primary colors are recognized as a desired color. An example of a set of the primary colors includes red, green, and blue colors. FIG. 2 shows an example of spatial division in that each pixel PX includes a color filter CF representing one of the primary colors in an area of the upper panel 200 facing the pixel electrode PE. Alternatively, the color filter CF is provided on or under the subpixel electrode PE1 or PE2 on the lower panel 100.

A pair of polarizers (not shown) are attached to outer surfaces of the panels 100 and 200. The polarization axes of the two polarizers may be crossed such that the crossed polarizers block the light incident onto the LC layer 3. One of the polarizers may be omitted.

Detailed structures of pixel electrodes, common electrodes, and color filters in LC panel assemblies will be described in detail with reference to FIGS. 3, 4, 5 and 6.

Figure 3:
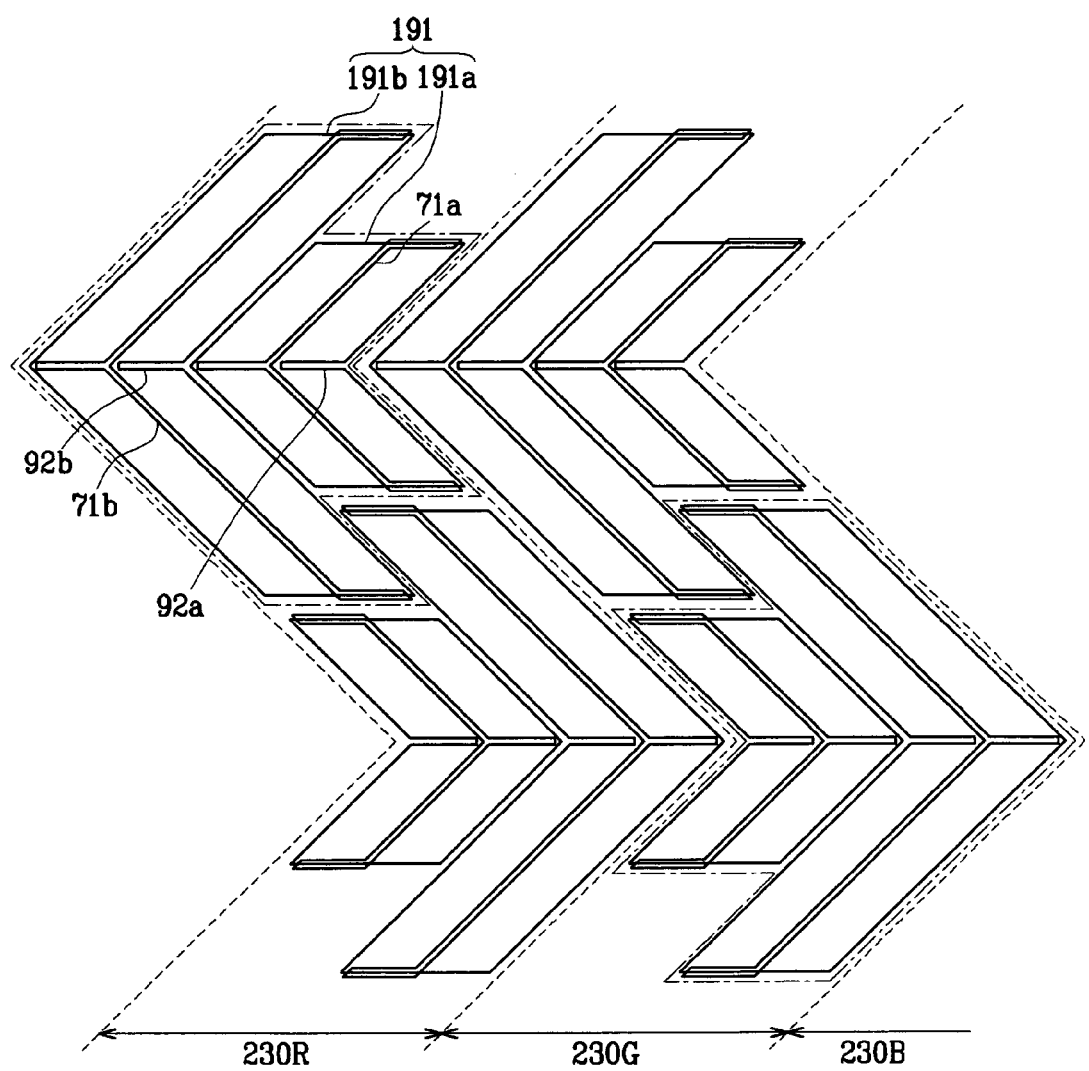
FIGS. 3-5 are layout diagrams of pixel electrodes, common electrodes, and color filters in LC panel assemblies according to exemplary embodiments of the present invention.
Figure 4:
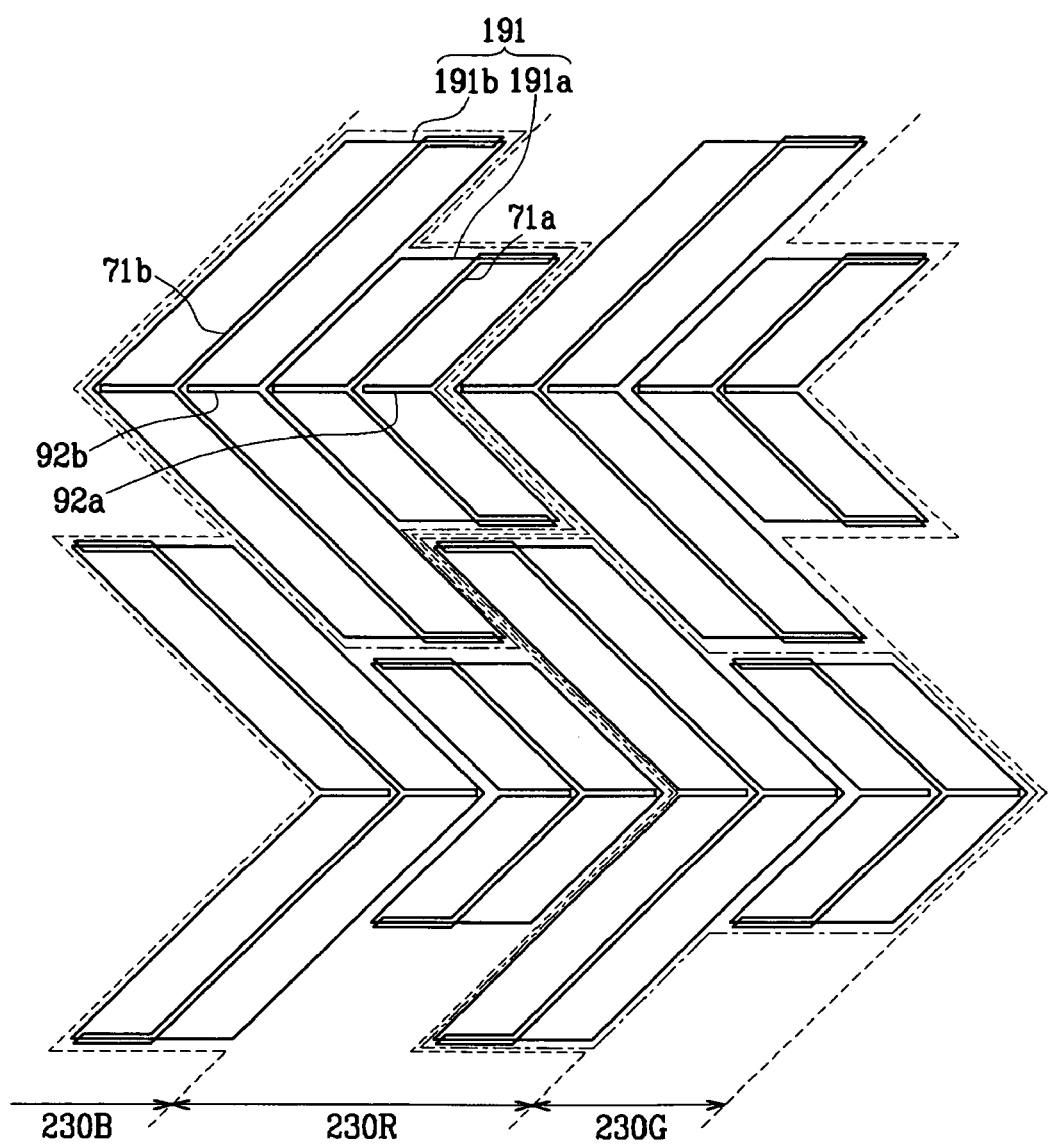
Figure 5:
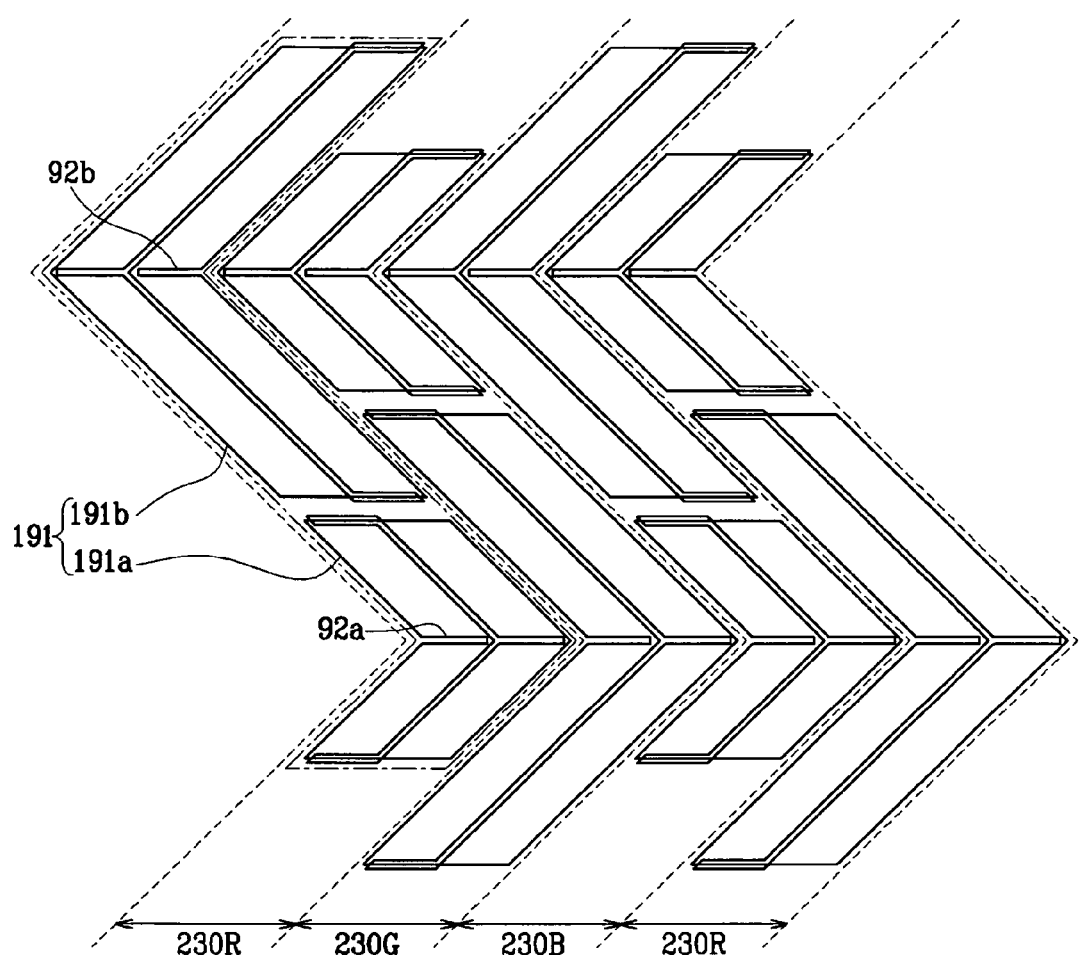
Figure 6:
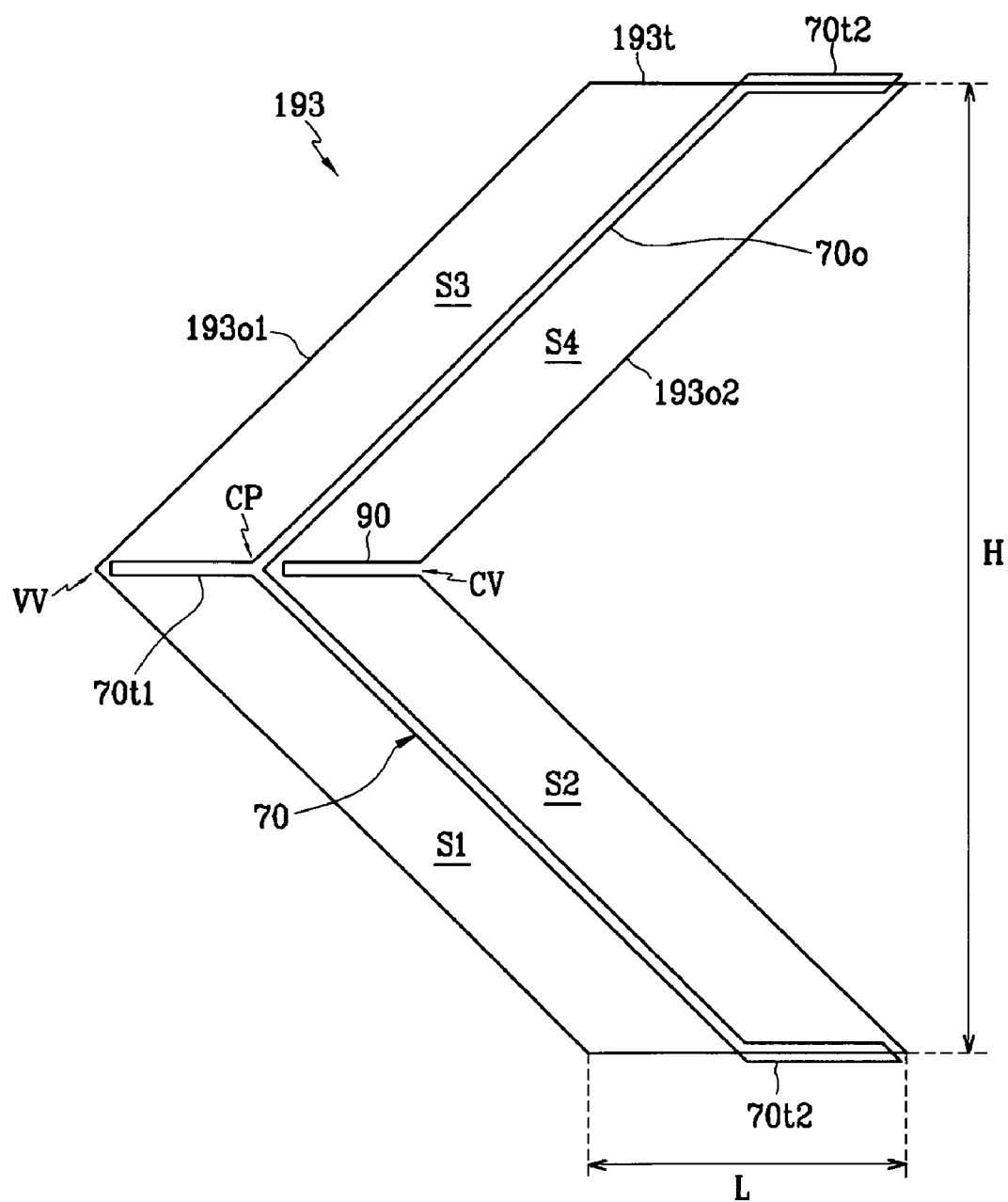
FIG. 6 is a planar view of a subpixel electrode representing the subpixel electrodes shown in FIGS. 3-5.

FIGS. 3-5 are layout diagrams of pixel electrodes, common electrodes, and color filters in LC panel assemblies according to exemplary embodiments of the present invention, and FIG. 6 is a planar view of a subpixel electrode representing the subpixel electrodes shown in FIGS. 3-5.

Referring to FIGS. 3-5, each pixel electrode 191 of the LC panel assemblies according to exemplary embodiments of the present invention, which pixel electrode is shown enclosed by a dash-dot line, includes a first subpixel electrode 191a and a second subpixel electrode 191b that are separated from each other. The subpixel electrodes 191a and 191b have cutouts 92a and 92b, respectively, and a common electrode CE (shown in FIG. 2) has a plurality of cutouts 71a and 71b facing the subpixel electrodes 191a and 191b, respectively. Red color filters 230R, green color filters 230G, and blue color filters 230B extend along the pixel electrodes 191 adjacent to each other in a column direction.

Both of the first and the second subpixel electrodes 191a and 191b forming the pixel electrode 191 may be coupled to respective switching elements (not shown). On the other hand, the first subpixel electrode 191a is coupled to a switching element (not shown), while the second subpixel electrode 191b is capacitively coupled to the first subpixel electrode 191a.

The subpixel electrodes 191a and 191b have substantially the same or similar shapes, and the cutouts 71a and 71b of the common electrode CE also have substantially the same or similar shapes. FIG. 6 shows a subpixel electrode 193 representing the subpixel electrodes 191a and 191b shown in FIGS. 3-5 and a cutout 70 representing the cutouts 71a and 71b shown in FIGS. 3-5.

As shown in FIG. 6, the subpixel electrode 193 has a pair of bent edges 193o1 and 193o2 and a pair of transverse edges 193t and has the shape of a chevron. The bent edges 193o1 and 193o2 include the convex edge 193o1 meeting the transverse edges 193t at an obtuse angle, for example, about 135 degrees, and the concave edge 193o2 meeting the transverse edges 193t at an acute angle, for example, about 45 degrees. The bent edges 193o1 and 193o2, which are formed by the 90-degree meeting of a pair of oblique edges, has a bent angle of about a right angle. Each of the subpixel electrodes 193 has a cutout 90 that extends from a concave vertex CV on the concave edge 193o2 toward a convex vertex VV on the convex edge 193o1 and reaches near a center of the subpixel electrode 193.

The cutout 70 in the common electrode includes a bent portion 70o having a bent point CP, a center transverse portion 70t1 connected to the bent point CP of the bent portion 70o, and a pair of terminal transverse portions 70t2 connected to ends of the bent portion 70o. The bent portion 70o of the cutout 70 includes a pair of oblique portions meeting at about a right angle, extends substantially parallel to the bent edges 193o1 and 193o2 of the subpixel electrode 193, and bisects the subpixel electrode 193 into left and right halves. The center transverse portion 70t1 of the cutout 70 makes an obtuse angle, for example, about 135 degrees with the bent portion 70*o*, and extends toward the convex vertex VV of the subpixel electrode 193. The terminal transverse portions 70*t*2 are aligned with the transverse edges 193*t* of the subpixel electrode 193 and make an obtuse angle, for example, about 135 degrees with the bent portion 70*o*.

The subpixel electrode 193 is divided into four sub-areas S1, S2, S3 and S4 by the cutouts 70 and 90. Each of the sub-areas S1-S4 has two primary edges defined by a bent portion 70*o* of the cutout 70 and by a bent edge 193*o* of the subpixel electrode 193. The distance between the primary edges, that is, the width of each sub-area S1-S4, may be equal to about 20-35 microns.

The subpixel electrode 193 and the cutout 70 has an inversion symmetry with respect to an imaginary straight line, referred to as a center transverse line, connecting the convex vertex VV and the concave vertex CV of the subpixel electrode 193.

Referring to FIG. 6, the length L of a transverse edge 193*t* of the subpixel electrode 193 is called the length of the subpixel electrode 193, and the distance H between the two transverse edges 193*t* of the subpixel electrode 193 is called the height of the subpixel electrode 193. In FIGS. 3-5, the length of the first subpixel electrode 191 a is substantially equal to the length of the second subpixel electrode 191*b*, and the height of the second subpixel electrode 191*b* is about twice the height of the first subpixel electrode 191*a*. Accordingly, the area of the second subpixel electrode 191*b* is about twice the area of the first subpixel electrode 191*a*.

As shown in FIGS. 3-5, the first subpixel electrode 191*a* and the second subpixel electrode 191*b* are alternately arranged in the row and column directions. However, the convexity and the concavity of the subpixel electrodes 191*a* and 191*b* are fixed in the row direction, while the convexity and the concavity of the subpixel electrodes 191*a* and 191*b* are alternately reversed in the column direction. For example, the upper one of two rows shown in FIGS. 3-5 includes subpixel electrodes 191*a* and 191*b* having convex left edges and concave right edges, while the lower one of the two rows includes subpixel electrodes 191*a* and 191*b* having concave left edges and convex right edges. It is noted that the second subpixel electrodes 191*b* in adjacent rows have contacting edges or portions.

Regarding the arrangement of the subpixel electrodes 191*a* and 191*b* in the row direction, the center transverse line of the first subpixel electrode 191*a* coincides with the center transverse line of the second subpixel electrode 191*b*. In addition, the convex edge of the first subpixel electrode 191*a* is a neighbor of the concave edge of the second subpixel electrode 191*b*, and the concave edge of the first subpixel electrode 191*a* is a neighbor of the convex edge of the second subpixel electrode 191*b*. Regarding the arrangement in the column direction, the convex edge of the first subpixel electrode 191*a* is connected to the concave edge of the second subpixel electrode 191*b*, and the concave edge of the first subpixel electrode 191*a* is connected to the convex edge of the second subpixel electrode 191*b*.

The first and the second subpixel electrodes 191*a* and 191*b* of each pixel electrode 191 shown in FIGS. 3 and 4 are adjacent to each other in the row direction, while the first and the second subpixel electrodes 191*a* and 191*b* of each pixel electrode 191 shown in FIG. 5 are adjacent to each other in the column direction.

Referring to FIG. 3, the relative positions of the first subpixel electrode 191*a* and the second subpixel electrode 191*b* in each pixel electrode 191 are reversed between two adjacent rows. For example, the first subpixel electrode 191*a* of each pixel electrode 191 in the upper one of two rows shown in FIG. 3 is disposed to the right of the second subpixel electrode 191*b*, while the first subpixel electrode 191*a* of each pixel electrode 191 in the lower one of two rows shown in FIG. 3 is disposed to the left of the second subpixel electrode 191*b*.

On the contrary, the relative positions of the first subpixel electrode 191*a* and the second subpixel electrode 191*b* in each pixel electrode 191 shown in FIG. 4 are the same in all rows. For example, the first subpixel electrode 191*a* of each pixel electrode 191 in all rows shown in FIG. 4 is disposed to the right of the second subpixel electrode 191*b*. However, the first subpixel electrode 191*a* may be disposed left to the second subpixel electrode 191*b*. In this arrangement, the pixel electrodes 191 adjacent in the column direction form a straighter line than those shown in FIG. 3.

In the arrangement shown in FIG. 5, the relative (column directional) positions of the first subpixel electrode 191*a* and the second subpixel electrode 191*b* in each pixel electrode 191 are reversed in two adjacent rows. For example, in the pixel electrode 191 in the leftmost column among the four columns shown in FIG. 5, the first subpixel electrode 191*a* is disposed down the second subpixel electrode 191*b*, while the first subpixel electrode 191*a* of the pixel electrode 191 in the next left column is disposed up the second subpixel electrode 191*b*. The width of the color filters 230R, 230G and 230B shown in FIG. 5 is a half of that shown in FIGS. 3 and 4.

In the above-described arrangements, the first and second subpixel electrodes 191*a* and 191*b* having an area ratio of about 1:2 are well organized without wasted space. The arrangements shown in FIGS. 3 and 4 may be suitable for large-pixel-size display devices, for example, for a large display device larger than about 32", in particular, for about 40" TV sets. On the contrary, the arrangement shown in FIG. 5 may be suitable for smaller-pixel-size display devices, for example, 17" or 19" monitors, etc.

In the meantime, since the color filters 230R, 230G and 230B extend almost straight along the column direction, a single-colored line may be easily displayed. In particular, the pixel electrodes 191 in each column shown in FIG. 4 form a straighter line to be more advantageous in displaying a longitudinal line.

In addition, the color filters 230R, 230G and 230B have equal areas to facilitate the balance of the colors.

Moreover, each of the pixel electrodes 191 is bent only once to give an increased aperture ratio as compared with pixel electrodes that are bent twice or more.

Referring to FIG. 1 again, the gray voltage generator 800 generates a plurality of gray voltages related to the light transmittance of the pixels PX. However, the gray voltage generator 800 may generate only a given number of gray voltages, referred to as reference gray voltages, instead of generating all of the gray voltages.

The gate driver 400 is connected to the gate lines of the panel assembly 300 and synthesizes the gate-on voltage Von and the gate-off voltage Voff from an external device to generate gate signals Vg for application to the gate lines.

The data driver 500 is connected to the data lines of the panel assembly 300 and applies data voltages Vd, which are selected from the gray voltages supplied from the gray voltage generator 800, to the data lines. However, the data driver 500 may generate gray voltages for all of the gray voltages by dividing the reference gray voltages and selecting the data voltages Vd from the generated gray voltages when the gray voltage generator 800 generates the reference gray voltages.

The signal controller 600 controls the gate driver 400 and the data driver 500, etc.

Each of the driving and processing units 400, 500, 600 and 800 may include at least one integrated circuit (IC) chip mounted on the LC panel assembly 300 or on a flexible printed circuit (FPC) film in a tape carrier package (TCP) arrangement, which are attached to the panel assembly 300. Alternatively, at least one of the driving and processing units 400, 500, 600 and 800 may be integrated into the panel assembly 300 along with the signal lines and the switching elements. Alternatively, all the driving and processing units 400, 500, 600 and 800 may be integrated into a single IC chip, but at least one of the driving and processing units 400, 500, 600 and 800 or at least one circuit element in at least one of the driving and processing units 400, 500, 600 and 800 may be disposed on a single IC chip.

Now, the operation of the above-described LCD will be described in detail.

The signal controller 600 is supplied with input image signals R, G and B and with input control signals for controlling the display thereof from an external graphics controller (not shown). The input image signals R, G and B contain luminance information of each pixel PX, and the luminance has a predetermined number of, for example $1024(=2^{10})$, $256(=2^8)$ or $64(=2^6)$ grays. The input control signals include a vertical synchronization signal Vsync, a horizontal synchronization signal Hsync, a main clock MCLK, and a data enable signal DE, etc.

After generating gate control signals CONT1 and data control signals CONT2 and processing the input image signals R, G and B suitable for the operation of the panel assembly 300 and the data driver 500 on the basis of the input control signals and the input image signals R, G and B, the signal controller 600 transmits the gate control signals CONT1 to the gate driver 400, and the processed image signals DAT and the data control signals CONT2 to the data driver 500. The output image signals DAT are digital signals having a predetermined number of values or grays.

The gate control signals CONT1 include a scanning start signal STV for instructing a scanning start and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of the start of the data transmission for a group of subpixels, a load signal LOAD for instructing to apply the data voltages to the panel assembly 300, and a data clock signal HCLK. The data control signal CONT2 may further include an inversion signal RVS for reversing the polarity of the data voltages, with respect to the common voltage Vcom.

Responsive to the data control signals CONT2 from the signal controller 600, the data driver 500 receives a packet of the image signals DAT for the group of subpixels from the signal controller 600. The data driver 500 converts the image signals DAT into analog data signals selected from the gray voltages supplied from the gray voltage generator 800, and applies the data signals to the data lines.

The gate driver 400 applies the gate-on voltage Von to the gate line in response to the gate control signals CONTI from the signal controller 600, thereby turning on the switching elements connected thereto. The data voltages applied to the data lines are supplied to the subpixels through the activated switching elements.

Referring to FIGS. 3-5, when the first subpixel electrode 191a and the second subpixel electrode 191b forming a pixel electrode 191 are coupled to respective switching elements, that is, when each of the subpixels includes its own switching element, the two subpixels may be supplied with respective data voltages through the same data line at different times or through different data lines at the same time. However, when the first subpixel electrode 191a is coupled to a switching element (not shown) and the second subpixel electrode 191b is capacitively coupled to the first subpixel electrode 191a, one subpixel electrode including the first subpixel electrode 191a may be directly supplied with data voltages through the switching elements, while the other subpixel including the second subpixel electrode 191b may have a voltage that varies depending on the voltage of the first subpixel electrode 191a. At this time, the first subpixel electrode 191a having a relatively small area preferably has a voltage, relative to the common voltage, greater than the second subpixel electrode 191b having a relatively large area.

On the other hand, after two subpixel electrodes 191a and 191b are charged with the same voltage, the voltages of the subpixel electrodes 191a and 191b may be differentiated from each other by using storage capacitors (not shown), etc.

When the voltage difference is generated between two terminals of the LC capacitor Clc1/Clc2, a primary electric field substantially perpendicular to the surfaces of the panels 100 and 200 is generated in the LC layer 3 and both the pixel electrodes 191, PE and the common electrode CE are commonly referred to as field generating electrodes. The LC molecules in the LC capacitor clc1/Clc2 tend to change their orientations in response to the electric field so that their long axes may be perpendicular to the field direction. The molecular orientations determine the polarization of light passing through the LC layer 3. The polarizer(s) converts the light polarization into the light transmittance such that the pixels PX display the luminance represented by the image signal DAT.

The tilt angle of the LC molecules depends on the strength of the electric field. Since the voltages of the LC capacitors clc1 and Clc2 are different from each other, the tilt angles of the LC molecules in the subpixels are different from each other and thus the luminances of the two subpixels are different. Accordingly, the voltages of the two subpixels can be adjusted so that an image viewed from a lateral side is the closest to an image viewed from the front, that is, a lateral gamma curve is the closest to the front gamma curve, thereby improving the lateral visibility.

In addition, the area of the subpixel electrode 191a having a voltage, relative to the common voltage Vcom, higher than that of the second subpixel electrode 191b may have an area smaller than that of the second subpixel electrode 191b, thereby making the lateral gamma curve further approach the front gamma curve. In particular, when the ratio of the areas of the first subpixel electrode 191a and the second subpixel electrode 191b is equal to about 1:2, the lateral gamma curve further approaches the front gamma curve to further improve the lateral visibility.

The tilt direction of the LC molecules is firstly determined by a horizontal field component. The horizontal field component is generated by the cutouts 71a, 71b, 92a and 92b of the field generating electrodes 191 and 270 CE and the edges of the subpixel electrodes 191a and 191b, which distort the primary electric field. The horizontal field component is substantially perpendicular to the edges of the cutouts 71a, 71b, 92a, 92b, and the edges of the first and second subpixel electrodes 191a and 191b.

Referring to FIGS. 3-5, since the LC molecules on each of the sub-areas divided by a set of the cutouts 71a, 71b, 92a, 92b tilt perpendicular to the major edges of the sub-area, the azimuthal distribution of the tilt directions are localized to four directions, thereby increasing the reference viewing angle of the LCD.

The width of the sub-areas, i.e., the distance between the bent portions of the cutouts of the common electrode CE and the bent edges of the subpixel electrodes 191a and 191b is preferably equal to about 20-35 microns as described above such that the horizontal component of the primary electric field can be suitably used and the decrease of the aperture ratio caused by the cutouts 71a, 71b, 92a, 92b can be reduced.

The direction of a secondary electric field due to the voltage difference between adjacent subpixel electrodes 191a and 191b is perpendicular to the major edges of the sub-areas. Accordingly, the field direction of the secondary electric field coincides with that of the horizontal component of the primary electric field. Consequently, the secondary electric field between the adjacent subpixel electrodes 191a and 191b enhances the determination of the tilt directions of the LC molecules.

By repeating this procedure by a unit of a horizontal period, which is denoted by "1H" and equal to one period of the horizontal synchronization signal Hsync or the data enable signal DE, all the pixels PX are supplied with data voltages.

When the next frame starts after one frame finishes, the inversion control-signal RVS applied to the data driver 500 is controlled such that the polarity of the data voltages is reversed, which is referred to as "frame inversion." The inversion control signal RVS may be also controlled such that the polarity of the data signals flowing in a data line are periodically reversed during one frame, for example, row inversion and dot inversion, or the polarity of the data signals in one packet are reversed, for example, column inversion and dot inversion.

The voltage across the LC capacitor clc1 or Clc2 forces the LC molecules in the LC layer 3 to be reoriented into a stable state corresponding to the voltage, and the reorientation of the LC molecules takes a time since the response time of the LC molecules is slow. The LC molecules continue to reorient themselves to vary the light transmittance or the luminance until they reach the stable state on the condition that the application of the voltage across the LC capacitor clc1 or Clc2 is maintained. When the LC molecules reach the stable state and stop the reorientation, the light transmittance becomes fixed.

When a pixel voltage in such a stable state is referred to as a target pixel voltage and a light transmittance in the stable state is referred to as a target light transmittance, the target pixel voltage and the target light transmittance have one-to-one correspondence.

Since the time for turning on the switching element of each pixel PX to apply a data voltage to the pixel is limited, it is difficult for the LC molecules in the pixel PX to reach the stable state during the application of the data voltage. However, even though the switching element is turned off, the voltage across the LC capacitor clc1 or Clc2 still exits and thus the LC molecules continue the reorientation such that the capacitance of the LC capacitor clc1 or Clc2 changes. Ignoring leakage current, the total amount of electrical charges stored in the LC capacitor clc1 or Clc2 is kept constant when the switching element turns off, because one terminal of the LC capacitor clc1 or Clc2 is floating. Therefore, the variation of the capacitance of the LC capacitor clc1 or Clc2 results in the variation of the voltage across the LC capacitor clc1 or Clc2, that is, the pixel voltage.

Consequently, when a pixel PX is supplied with a data voltage corresponding to a target pixel voltage, referred to as a "target data voltage" hereinafter, which is determined in the stable state, an actual pixel voltage of the pixel PX may be different from the target pixel voltage such that the pixel PX may not reach a corresponding target light transmittance. The actual pixel voltage differs more from the target pixel voltage as the target transmittance differs more from a light transmittance that the subpixel initially has.

Accordingly, a data voltage applied to the pixel PX is required to be higher or lower than a target data voltage and for example, this can be realized by DCC (dynamic capacitance compensation).

DCC, which may be performed by the signal controller 600 or a separate image signal modifier, modifies an image signal of a frame, referred to as a "current image signal" hereinafter, for a subpixel to generate a modified current image signal referred to as a "modified (current) image signal" hereinafter based on an image signal of an immediately previous frame, referred to as a "previous image signal" hereinafter, for the subpixel. The modified image signal is basically obtained by experiments, and the difference between the modified current image signal and the previous image signal is usually larger than the difference between the current image signal before modification and the previous image signal. However, when the current image signal and the previous image signal are equal to each other or the difference therebetween is small, the modified image signal may be equal to the current image signal, that is, the current image signal may not, be modified.

In this way, the data voltages applied to the subpixels by the data driver 500 are higher or lower than the target data voltages.

However, the target transmittance may not be obtained by the above-described method. In this case, a predetermined voltage, referred to as a pre-tilt voltage hereinafter, is pre-applied to the subpixel to pre-tilt the LC molecules and then, a primary voltage is applied to the subpixel.

For this purpose, the signal controller 600 or an image signal modifier modifies a current image signal in consideration of an image signal of the next frame, referred to as a "next image signal" hereinafter, as well as a previous image signal. For example, if the next image signal is very different from the current image signal, even though the current image signal is equal to the previous image signal, the current image signal is modified to prepare the next frame.

The modification of the image signals and the data voltages may or may not be performed for the highest gray or the lowest gray. In order to modify the highest gray or the lowest gray, the range of the gray voltages generated by the gray voltage generator 800 may be widened as compared with the range of the target data voltages required for obtaining the range of the target luminance, or the target transmittance, represented by the grays of the image signals.

Now, structures of LC panel assemblies according to exemplary embodiments of the present invention will be described in detail with reference to FIGS. 7, 8, 9, 10, 11, 12, 13, 14, 15, 16 and 17 as well as FIGS. 1-4.

Figure 7:
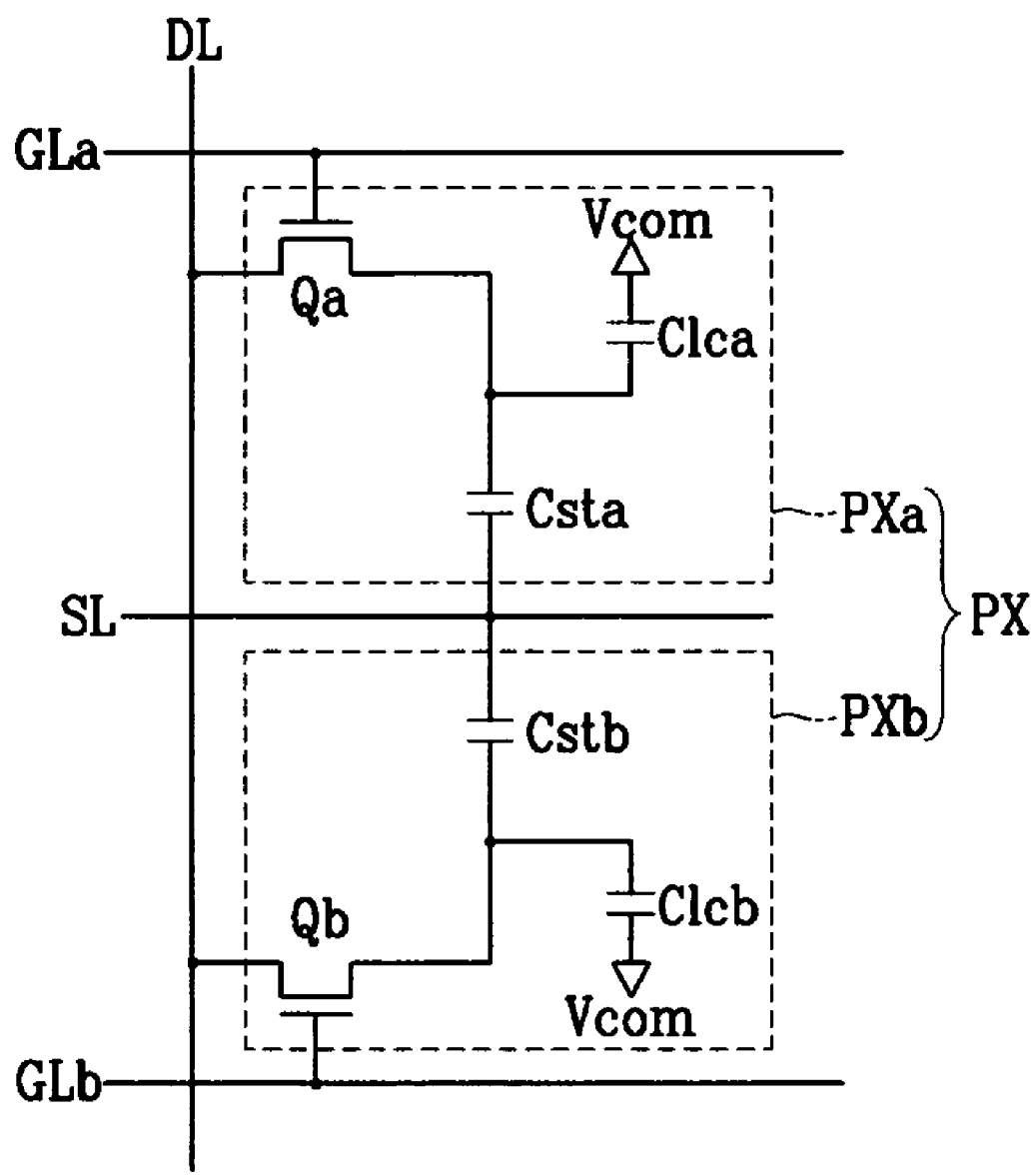
FIG. 7 is an equivalent circuit diagram of signal lines and a pixel according to an exemplary embodiment of the present invention.

FIG. 7 is an equivalent circuit diagram of signal lines and a pixel according to an exemplary embodiment of the present invention.

The LC panel assembly shown in FIG. 7 includes a plurality of signal lines and a plurality of pixels PX connected thereto. The signal lines include a plurality of pairs of gate lines GLa and GLb, a plurality of data lines DL, and a plurality of storage electrode lines SL extending substantially parallel to the gate lines GLa and GLb.

Each pixel PX includes a pair of subpixels PXa and PXb. Each subpixel PXa/PXb includes a switching element Qa/Qb connected to one of the gate lines GLa and GLb and one of the data lines DL, an LC capacitor Clca/Clcb coupled to the switching element Qa/Qb, and a storage capacitor Csta/Cstb connected between the switching element Qa/Qb and the storage electrode line SL.

The switching element Qa/Qb such as a thin film transistor (TFT) is provided on the lower panel 100 and has three terminals: a control terminal connected to a gate line GLa/GLb; an input terminal connected to a data line DL; and an output terminal connected to the LC capacitor Clca/Clcb and the storage capacitor Csta/Cstb.

The storage capacitor Csta/Cstb is an auxiliary capacitor for the LC capacitor Clca/Clcb. The storage capacitor Csta/Cstb includes a subpixel electrode and a separate signal line, which is provided on the lower panel 100, overlaps the subpixel electrode via an insulator, and is supplied with a predetermined voltage such as the common voltage Vcom. Alternatively, the storage capacitor Csta/Cstb includes the subpixel electrode and an adjacent gate line called a previous gate line, which overlaps the subpixel electrode via an insulator.

Since the LC capacitor Clca/Clcb and so on are described above with reference to FIG. 2, a detailed description thereof will be omitted.

In the LCD shown in FIG. 7, the signal controller 600 receives input image signals R, G and B and converts an input image signal R, G and B for each pixel PX into a pair of output image signals DAT for two subpixels PXa and PXb to be supplied to the data driver 500. Otherwise, the gray voltage generator 800 generates a pair of groups of gray voltages for respective subpixels PXa and PXb. The two groups of gray voltages are alternately supplied by the gray voltage generator 800 to the data driver 500 or alternately selected by the data driver 500, such that the two subpixels PXa and PXb are supplied with different voltages.

At this time, the values of the converted output image signals and the values of the gray voltages in each group are preferably determined such that the synthesis of gamma curves for the two subpixels PXa and PXb approaches a reference gamma curve at a front view. For example, the synthesized gamma curve at a front view coincides with the most suitable reference gamma curve at a front view, and the synthesized gamma curve at a lateral view is the most similar to the reference gamma curve at a front view.

An example of an LC panel assembly shown in FIG. 8 according to an exemplary embodiment of the present invention will be described in detail with reference to FIGS. 8-11.

Figure 8:
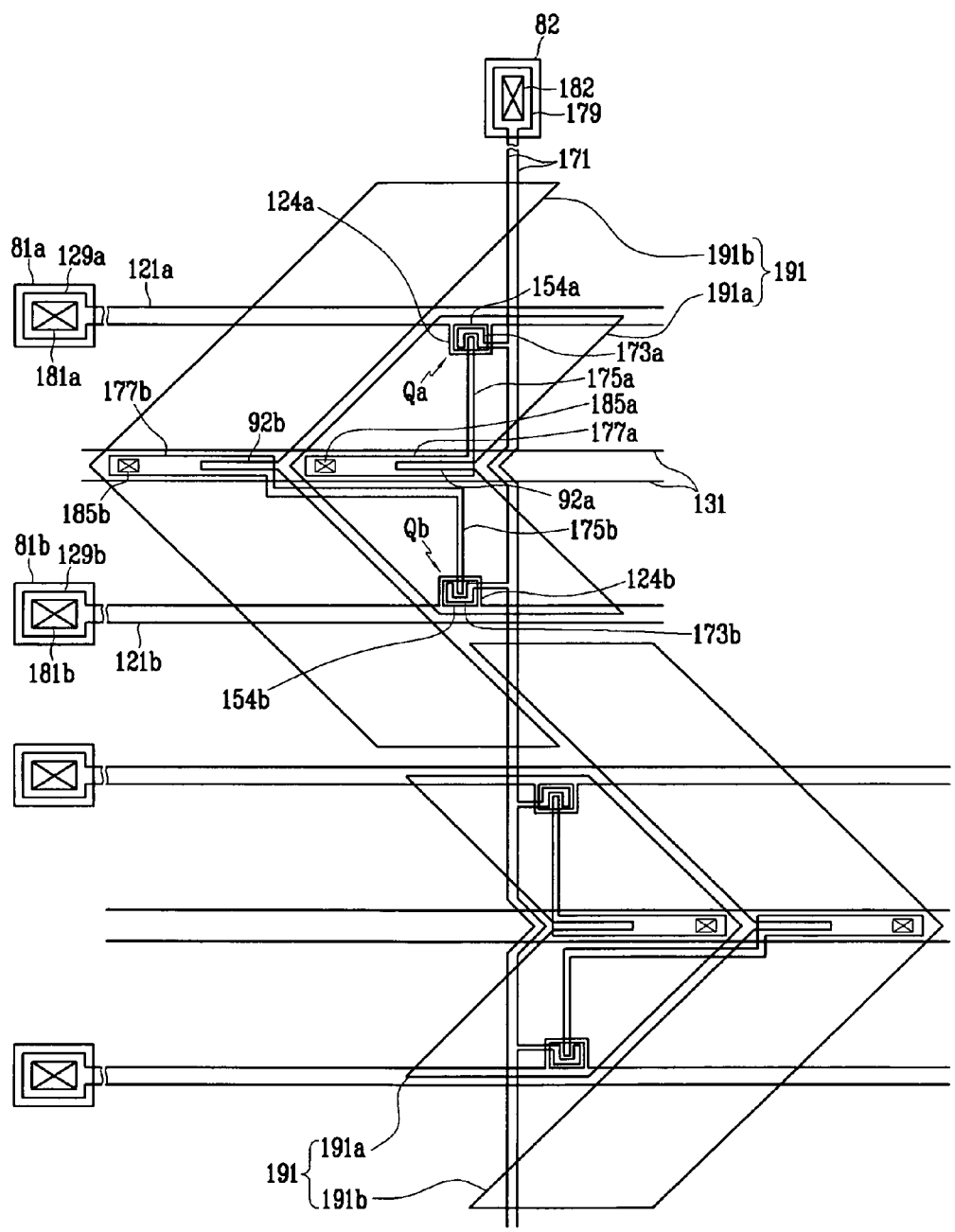
FIG. 8 is a layout view of a lower panel for an LC panel assembly according to an exemplary embodiment of the present invention.
Figure 9:
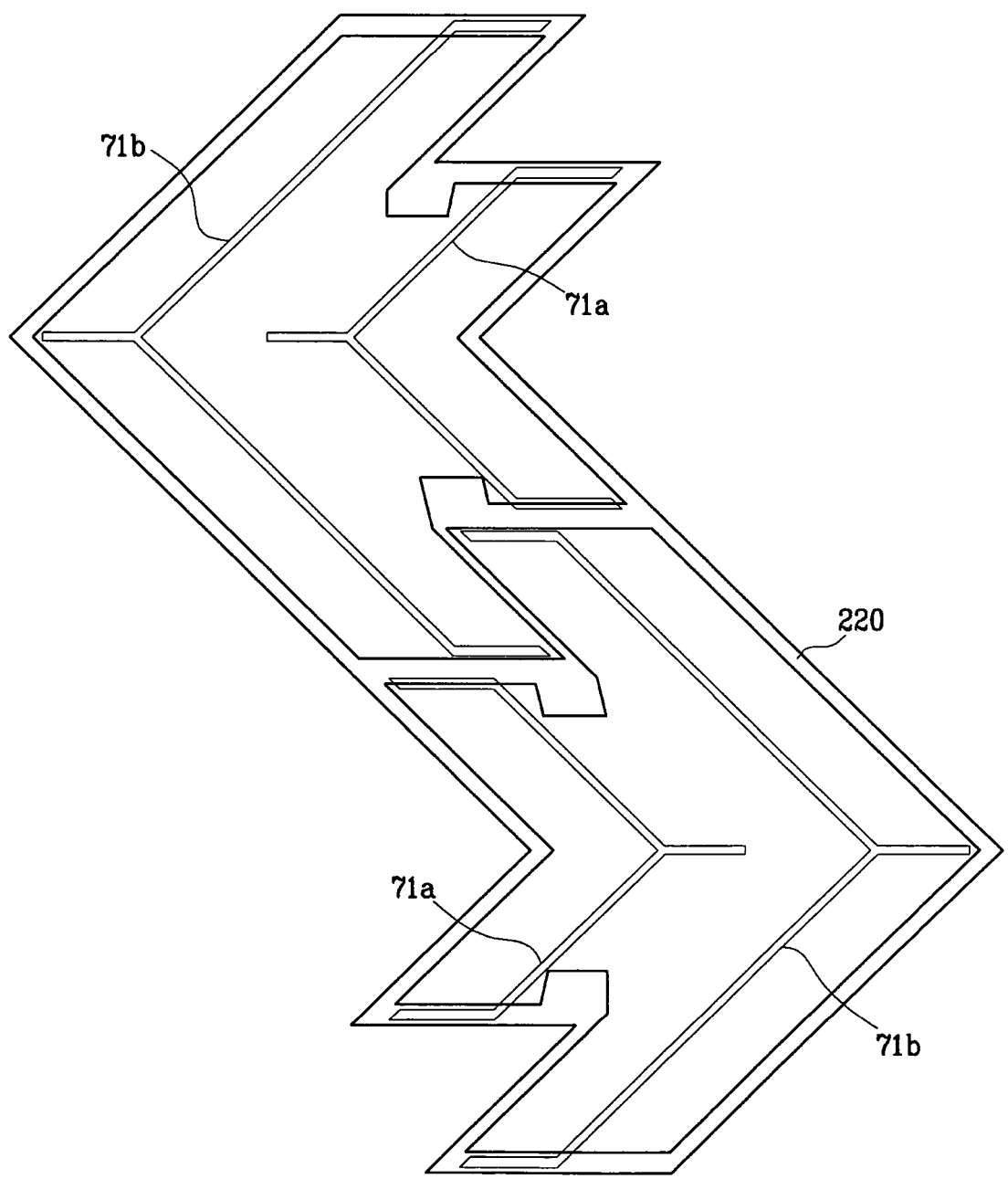
FIG. 9 is a layout view of an upper panel for an LC panel assembly according to an exemplary embodiment of the present invention.
Figure 10:
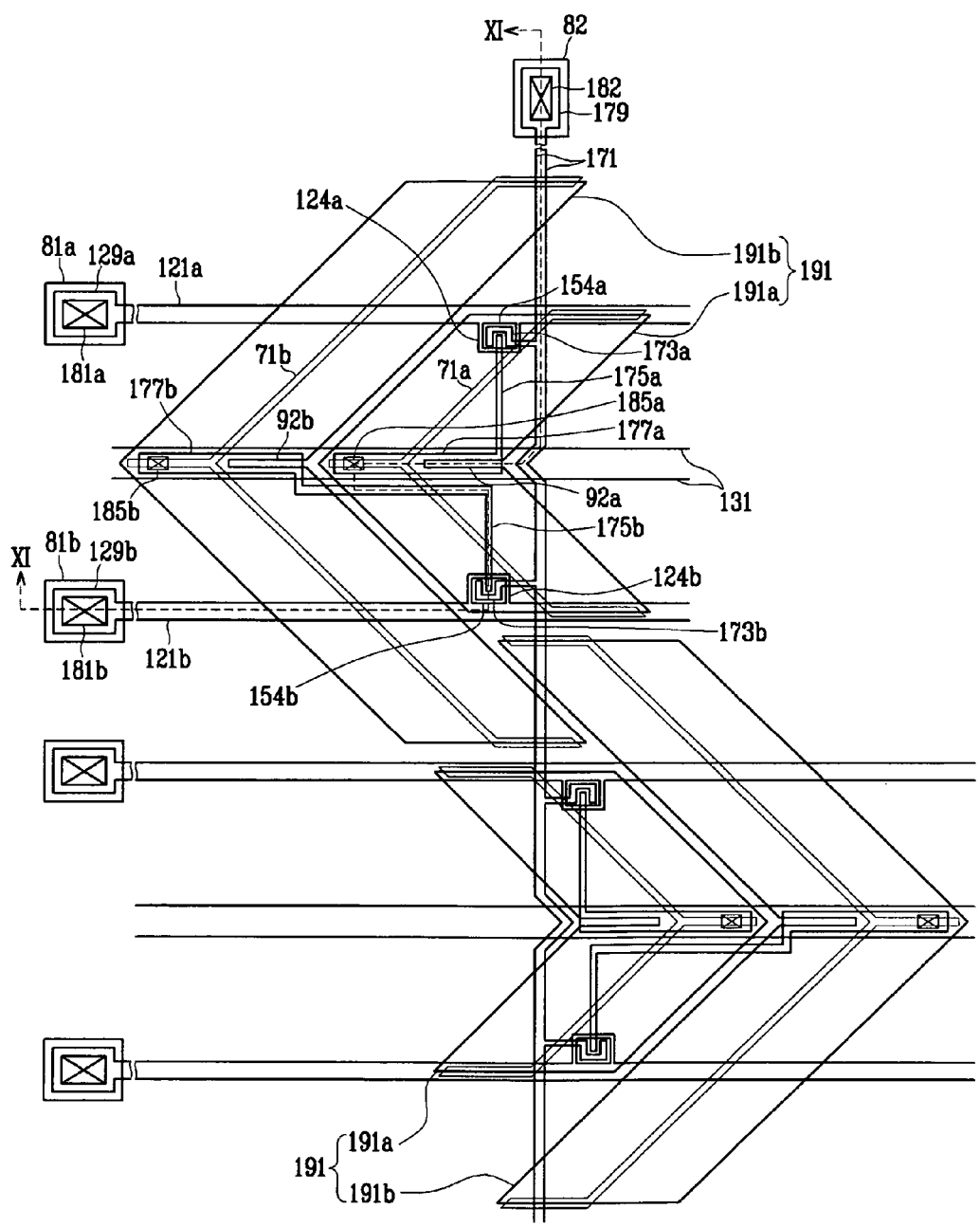
FIG. 10 is a layout view of an LC panel assembly including the lower panel shown in FIG. 8 and the upper panel shown in FIG. 9.
Figure 11:
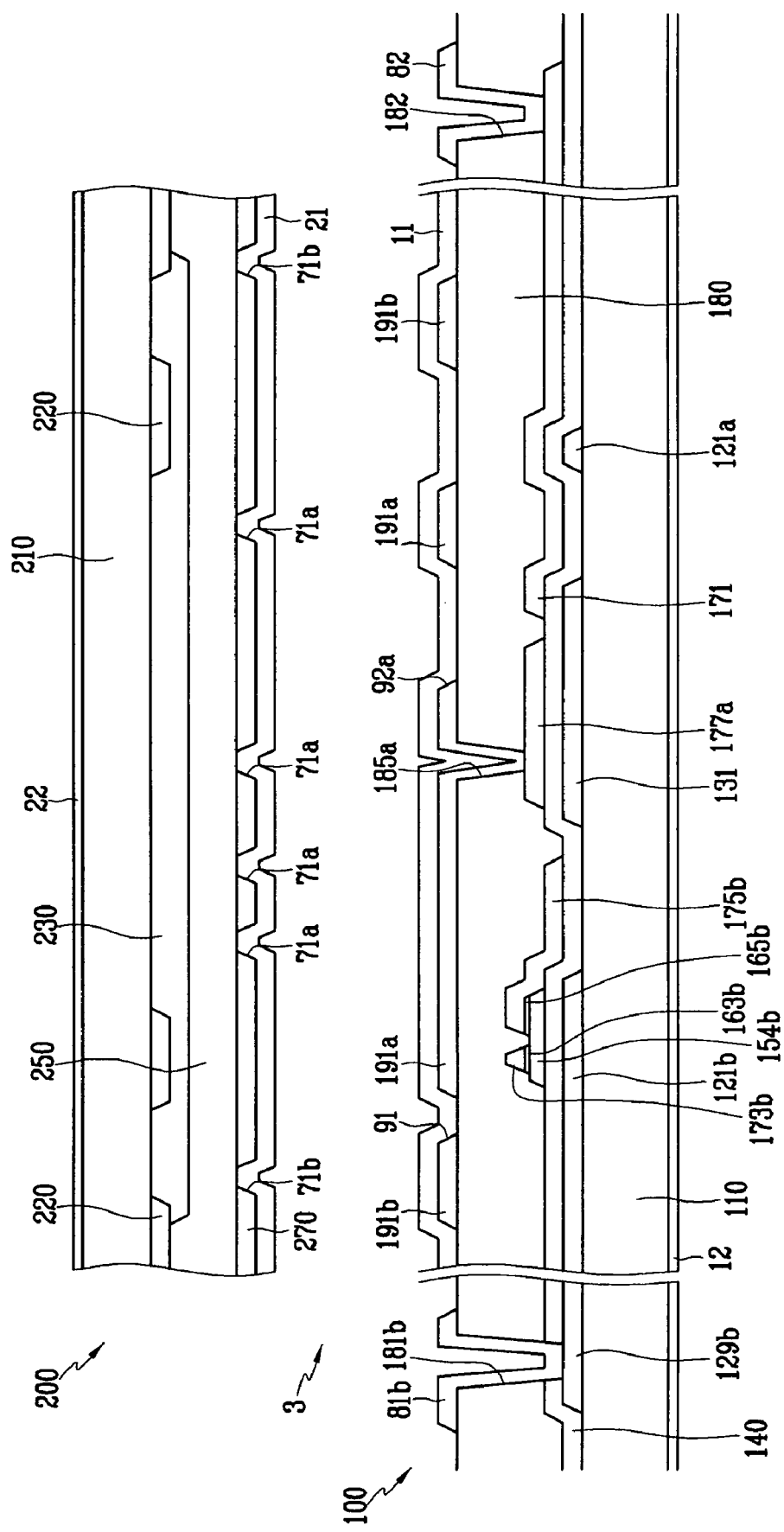
FIG. 11 is an exemplary sectional view of the LC panel assembly shown in FIG. 10 taken along line XI-XI.

FIG. 8 is a layout view of a lower panel for an LC panel assembly according to an exemplary embodiment of the present invention, FIG. 9 is a layout view of an upper panel for an LC panel assembly according to an exemplary embodiment of the present invention, FIG. 10 is a layout view of an LC panel assembly including the lower panel shown in FIG. 8 and the upper panel shown in FIG. 9, and FIG. 11 is an exemplary sectional view of the LC panel assembly shown in FIG. 10 taken along line XI-XI.

Referring to FIGS. 8-11, an LC panel assembly according to an exemplary embodiment of the present invention includes a lower panel 100, a upper panel 200 facing the lower panel 100, and a liquid crystal layer 3 interposed between the panels 100 and 200.

First, the lower panel 100 will be described with reference to FIGS. 8, 10 and 11.

A plurality of gate conductors including a plurality of pairs of first and second gate lines 121a and 121b and a plurality of storage electrode lines 131 are formed on an insulating substrate 110 such as transparent glass or plastic.

The gate lines 121a and 121b transmit gate signals, extend substantially in a transverse direction, and are disposed at relatively upper and lower positions, respectively.

Each of the first gate lines 121a includes a plurality of first gate electrodes 124a projecting downwardly and an end portion 129a having a large area for contact with another layer or connection to an external driving circuit. Each of the second gate lines 121b includes a plurality of second gate electrodes 124b projecting upwardly toward and an end portion 129b having a large area for contact with another layer or connection to an external driving circuit. The first and second gate lines 121a and 121b may extend to be connected to a gate driver 400 that may be integrated on the substrate 110.

The storage electrode lines 131 are supplied with a predetermined voltage, such as the common voltage Vcom, and extend substantially parallel to the first and second gate lines 121a and 121b. Each of the storage electrode lines 131 is disposed between first and second gate lines 121a and 121b and it is nearly equidistant from the first gate line 121a and the second gate line 121b. The storage electrode lines 131 may have various shapes and arrangements. For example, each of the storage electrode lines 131 may include a plurality of expansions expanding upward and downward.

The first and second gate lines 121a, 121b and the storage electrode line 131 may be made of an Al containing metal such as Al and Al alloy, an Ag containing metal such as Ag and Ag alloy, a Cu containing metal such as Cu and Cu alloy, an Mo containing metal such as Mo and Mo alloy, Cr, Ta, or Ti. However, they may have a multi-layered structure including two conductive films (not shown) having different physical characteristics. One of the two films may be made of low resistivity metal including an Al containing metal, an Ag containing metal, and a Cu containing metal for reducing signal delay or voltage drop. The other film may be made of material such as an Mo containing metal, Cr, Ta, or Ti, which has good physical, chemical, and electrical contact characteristics with other materials such as indium tin oxide (ITO) or indium zinc oxide (IZO). Examples of the combination of the two films are a lower Cr film and an upper Al (alloy) film and a lower Al (alloy) film and an upper Mo (alloy) film. However, the first and second gate lines 121a, 121b and the storage electrode line 131 may be made of various metals or conductors.

The lateral sides of the first and second gate lines 121a, 121b and the storage electrode line 131 are inclined relative to a surface of the substrate, and the inclination angle thereof ranges about 30-80 degrees.

A gate insulating layer 140 that may be made of silicon nitride (SiNx) or silicon oxide (SiOx) is formed on the first and second gate lines 121a, 121b and the storage electrode line 131.

A plurality of first and second semiconductor islands 154a and 154b that may be made of hydrogenated amorphous silicon (abbreviated to "a-Si") or polysilicon are formed on the gate insulating layer 140. The first/second semiconductor islands 154a/154b are disposed on the first/second gate electrodes 124a/124b.

A plurality of pairs of ohmic contact islands 163b and 165b are formed on the semiconductor islands 154b, and a plurality of pairs of ohmic contact islands (not shown) are formed on the semiconductor islands 154a. The ohmic contact islands 163b and 165b may be made of n+ hydrogenated a-Si heavily doped with an n-type impurity such as phosphorous or they may be made of silicide.

The lateral sides of the semiconductor islands 154a and 154b and the ohmic contacts 163b and 165b are inclined relative to the surface of the substrate 110, and the inclination angles thereof may be in a range of about 30-80 degrees.

A plurality of data conductors including a plurality of data lines 171 and a plurality of pairs of first and second drain electrodes 175a and 175b are formed on the ohmic contacts 163b and 165b and the gate insulating layer 140.

The data lines 171 transmit data signals and extend substantially in the longitudinal direction to intersect the first and second gate lines 121a and 121b and the storage electrode lines 131. Each of the data lines 171 includes a plurality of bent portions projecting left or right near the intersections with the storage electrode lines 131. Each of the bent portions includes a pair of oblique portions that are connected to each other to form a chevron and make an angle of about 45 degrees with the gate lines 121.

Each data line 171 includes a plurality of first and second source electrodes 173a and 173b projecting toward the first and the second gate electrodes 124a and 124b, respectively, and an end portion 179 having a large area for contact with another layer or for connection to an external driving circuit. The data lines 171 may extend to be connected to a data driver 500 that may be integrated on the substrate 110.

The first and the second drain electrodes 175a and 175b are separated from each other and separated from the data lines 171. The first/second drain electrodes 175a/175b are disposed opposite the first/second source electrodes 173a/173b with respect to the first/second gate electrodes 124a/124b. Each of the first/second drain electrodes 175a/175b includes a wide end portion 177a/177b and a narrow end portion. The wide end portion 177a/177b overlaps a storage electrode line 131 and the narrow end portion partly enclosed by a first/second source electrode 173a/173b.

A first/second gate electrode 124a/124b, a first/second source electrode 173a/173b, and a first/second drain electrode 175a/175b along with a first/second semiconductor island 154a/154b form a first/second TFT Qa/Qb having a channel formed in the first/second semiconductor island 154a/154b disposed between the first/second source electrode 173a/173b and the first/second drain electrode 175a/175b.

The data conductors 171, 175a and 175b may be made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171, 175a and 175b may be made of various metals or conductors.

The data conductors 171, 175a and 175b have inclined edge profiles, and the inclination angles thereof range about 30-80 degrees.

The ohmic contacts 163b and 165b are interposed only between the underlying semiconductor islands 154a and 154b and the overlying data conductors 171, 175a and 175b thereon and reduce the contact resistance therebetween. The semiconductor islands 154a and 154b include some exposed portions, which are not covered with the data conductors 171, 175a and 175b, such as the portions located between the source electrodes 173 and the drain electrodes 175a and 175b.

A passivation layer 180 is formed on the data conductors 171, 175a and 175b and the exposed portions of the semiconductor islands 154a and 154b. The passivation layer 180 may be made of inorganic or organic insulator and it may have a flat top surface. Examples of the inorganic insulator include silicon nitride and silicon oxide. The organic insulator may have photosensitivity and a dielectric constant less than about 4.0. The passivation layer 180 may include a lower film of an inorganic insulator and an upper film of an organic insulator such that it provides the excellent insulating characteristics of the organic insulator while preventing the exposed portions of the semiconductor islands 154a and 154b from being damaged by the organic insulator.

The passivation layer 180 has a plurality of contact holes 182, 185a and 185b exposing the end portions 179 of the data lines 171 and the first and the second drain electrodes 175a and 175b, respectively. The passivation layer 180 and the gate insulating layer 140 have a plurality of contact holes 181a and 181b exposing the end portions 129a and 129b of the gate lines 121a and 121b.

A plurality of pixel electrodes 191 and a plurality of contact assistants 81a, 81b and 82 are formed on the passivation layer 180. They may be made of a transparent conductor such as ITO or IZO or a reflective conductor such as Ag, Al, Cr, or alloys thereof.

The pixel electrodes 191 have the structure shown in FIG. 3 and each pixel electrode 191 includes a pair of subpixel electrodes 191a and 191b. The subpixel electrodes 191a and 191b include cutouts 92a and 92b.

The data lines 171, in particular, the bent portions of the data lines 171 extend along some of the bent edges of the pixel electrodes 191. Therefore, the electric field generated between the data lines 171 and the subpixel electrodes 191a and 191b has a horizontal component substantially parallel to the horizontal component of the primary electric field such that the determination of the tilt direction of the LC molecules is enhanced. In addition, the aperture ratio is increased.

The storage electrode lines 131, the expansions 177a and 177b, of the drain electrodes 175a and 175b, and the contact holes 185a and 185b lie on straight lines connecting bent points of the subpixel electrodes 191a and 191b. The straight lines connecting the bent points of the subpixel electrodes 191a and 191b form boundaries of the above-described sub-areas, and thus this configuration can cover texture that may be generated by the disorder of the LC molecules near the boundaries of the sub-areas, thereby improving the aperture ratio.

Since other features of the pixel 191 are described above with reference to FIG. 3, the detailed description thereof will be omitted.

The first/second subpixel electrodes 191a/191b are physically and electrically connected to the first/second drain electrodes 175a/175b through the contact holes 185a/185b such that the first/second subpixel electrode 191a/191b receives data voltages from the first/second drain electrodes 175a/175b. A first/second subpixel electrode 191a/191b and the common electrode 270 form a first/second LC capacitor Clca/Clcb, which stores applied voltages after the TFT turns off.

A first/second storage capacitor Csta/Cstb for enhancing the charge storing capacity are formed by overlapping an expansion 177a/177b of a first/second drain electrode 175a/175b connected to a first/second subpixel electrode 191a/191a with a storage electrode line 131.

The contact assistants 81a, 81b and 82 are connected to the end portions 129a and 129b of the gate lines 121a and 121b and the end portions 179 of the data lines 171 through the contact holes 181a, 181b and 182, respectively. The contact assistants 81a, 81b and 82 protect the end portions 129a, 129b and 179 and enhance the adhesion between the end portions 129, 129b and 179 and external devices.

The description of the upper panel 200 follows with reference to FIGS. 9-11.

A light blocking member 220 referred to as a black matrix is formed on an insulating substrate 210 such as transparent glass or plastic. The light blocking member 220 includes a plurality of linear portions facing the boundaries of the pixel electrodes 191 on the lower panel 100 and a plurality of widened portions facing the TFTs Qa and Qb on the lower panel 100. The light blocking member 220 blocks light leakage near the pixel electrodes 191 and the TFTs Qa and Qb and may have various shapes.

A plurality of color filters 230 are also formed on the substrate 210 and the light blocking member 220. The color filters 230 are disposed substantially in the areas enclosed by the light blocking member 220 and the color filters 230 may extend substantially in the longitudinal direction along the pixel electrodes 191. Each of the color filters 230R represents one of the three primary colors, such as red, green, and blue.

An overcoat 250 is formed on the color filters 230 and the light blocking member 220. The overcoat 250 may be made of an (organic) insulator, and it prevents the color filters 230 from being exposed and provides a flat surface. The overcoat 250 may be omitted.

A common electrode 270 is formed on the overcoat 250. The common electrode 270 may be made of transparent conductive material such as ITO and IZO and has a plurality of sets of cutouts 71a and 71b that are described above with reference to FIG. 3.

The number of the cutouts 71a and 71b may be varied depending on the design factors, and the light blocking member 220 may also overlap the cutouts 71a and 71b to block the light leakage through the cutouts 71a and 71b.

Alignment layers 11 and 21 that may be homeotropic are coated on inner surfaces of the panels 100 and 200.

Polarizers 12 and 22 are provided on outer surfaces of the panels 100 and 200 so that their polarization axes may be crossed and the polarization axes may make an angle of about 45 degrees with the bent edges of the subpixel electrodes 191a and 191b for increasing light efficiency. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film, and the panels 100 and 200.

It is preferable that the LC layer 3 has negative dielectric anisotropy and is subjected to a vertical alignment.

The shapes and the arrangements of the cutouts 71a, 71b, 92a and 92b may be modified.

At least one of the cutouts 71a, 71b, 92a and 92b can be substituted for by protrusions (not shown) or depressions (not shown). The protrusions may be made of organic or inorganic material and disposed on or under the field generating electrodes 191 or 270.

Another example of an LC panel assembly shown in FIG. 10 will be described in detail with reference to FIG. 12.

Figure 12:
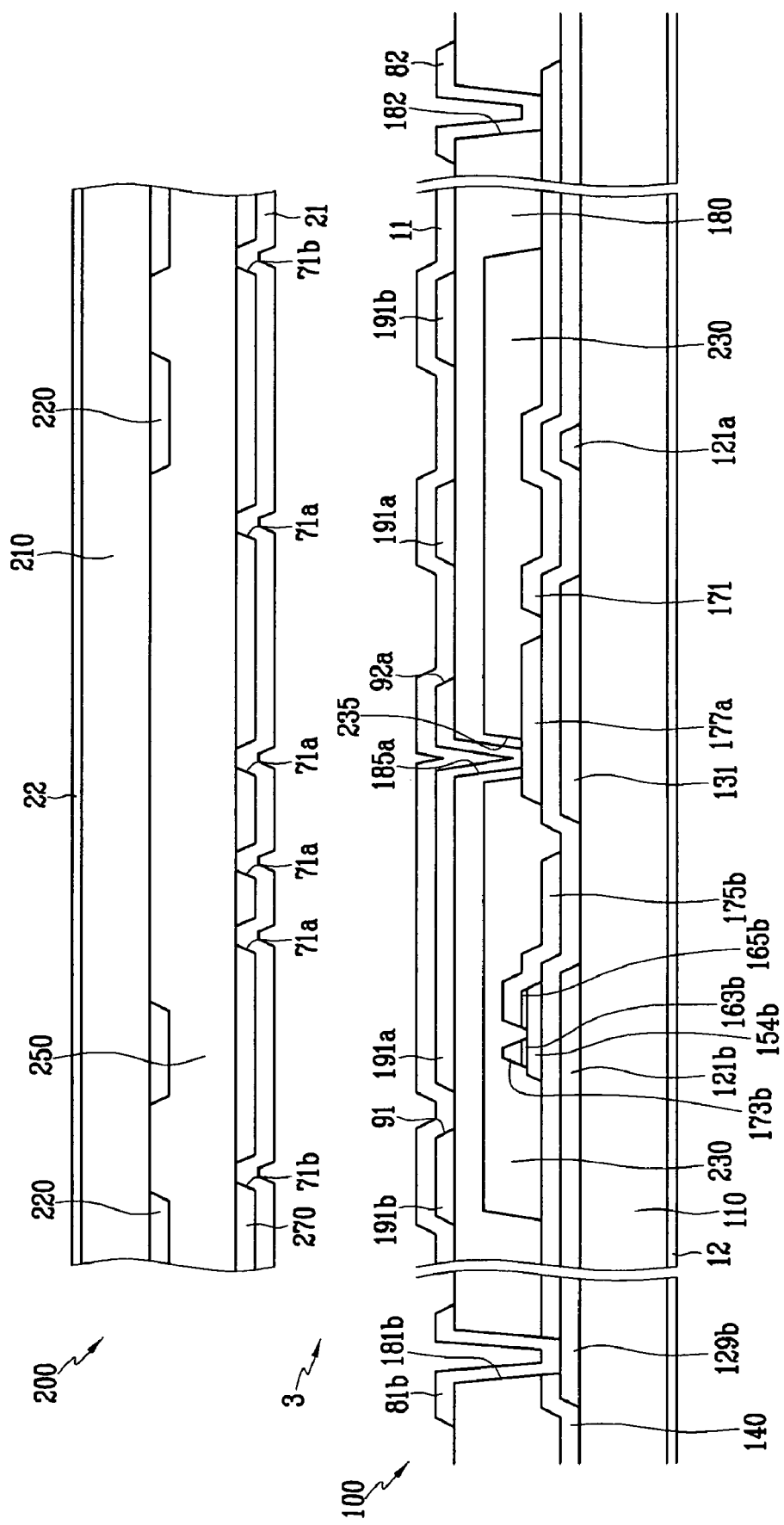
FIG. 12 is another exemplary sectional view of the LC panel assembly shown in FIG. 10 taken along line XI-XI.

FIG. 12 is another exemplary sectional view of the LC panel assembly shown in FIG. 10 taken along line XI-XI.

Referring to FIG. 12, an LC panel assembly according to this embodiment includes a lower panel 100, an upper panel 200 facing the lower panel 100, an LC layer 3, and a pair of polarizers 12 and 22.

Layered structures of the LC panel assembly according to this exemplary embodiment are similar to those shown in FIG. 11.

Regarding the lower panel 100, gate conductors including a plurality of first and second gate lines 121a and 121b and a plurality of storage electrode lines 131 are formed on a substrate 110. The first and the second gate lines 121a and 121b include first and second gate electrodes 124a and 124b and end portions 129a and 129b, respectively. A gate insulating layer 140, a plurality of semiconductor islands 154a and 154b, and a plurality of ohmic contacts 163b and 165b are sequentially formed on the first and second gate lines 121a, 121b and the storage electrode lines 131. Data conductors including a plurality of data lines 171 and a plurality of first and second drain electrodes 175a and 175b are formed on the ohmic contacts 163b and 165b and the gate insulating layer 140. The data lines 171 include first and second source electrodes 173a and 173b and end portions 179, and the drain electrodes 175a and 175b include wide end portions 177a and 177b. A passivation layer 180 is formed on the data conductors 171, 175a and 175b, the gate insulating layer 140, and exposed portions of the semiconductor islands 154a and 154b. A plurality of contact holes 181a, 181b, 182, 185a and 185b are provided at the passivation layer 180 and the gate insulating layer 140. A plurality of pixel electrodes 191 including subpixel electrodes 191a and 191b and having cutouts 92a and 92b and a plurality of contact assistants 81a, 81b and 82 are formed on the passivation layer 180, and an alignment layer 11 is coated thereon.

Regarding the upper panel 200, a light blocking member 220, an overcoat 250, a common electrode 270 having a plurality of cutouts 71a and 71b, and an alignment layer 21 are formed on an insulating substrate 210.

Unlike the LC panel assembly shown in FIG. 11, the lower panel 100 shown in FIG. 12 includes a plurality of color filters 230 disposed under the passivation layer 180, while the upper panel 200 has no color filter.

The color filters 230 extend along a longitudinal direction while being bent periodically and are not provided in peripheral areas where the end portions 129a and 129b of the first and second gate lines 121a and 121b and the end portions 179 of the data lines 171 are disposed. The color filters 230 have through holes 235 larger than the contact holes 185a so that the contact holes 185a may pass through the through holes 235.

Adjacent color filters 230 may overlap each other near the boundaries of the pixel electrodes 191 to block any light leakage therebetween, so as to act like the light blocking member 220. In this case, the light blocking member 220 disposed on the upper panel 200 may be omitted to simplify the manufacturing process.

Another passivation layer (not shown) may be formed under the color filters 230.

The overcoat 250 on the upper panel 200 may be omitted.

Many of the above-described features of the LC panel assembly shown in FIG. 11 may be applicable to the LC panel assembly shown in FIG. 12.

Another example of an LC panel assembly shown in FIG. 7 will be described in detail with reference to FIGS. 13, 14, 15 and 16.

Figure 13:
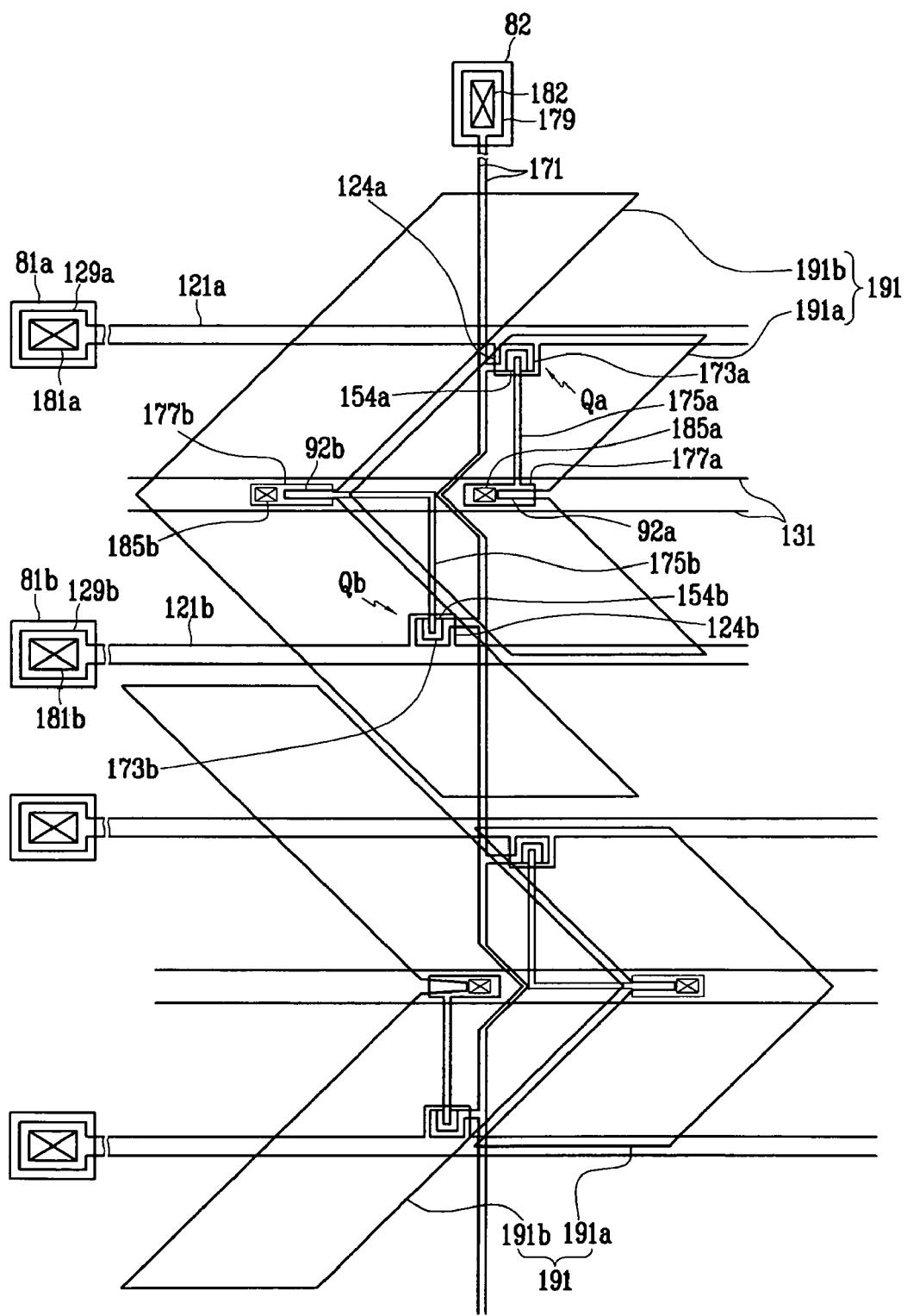
FIG. 13 is a layout view of a lower panel for an LC panel assembly according to an exemplary embodiment of the present invention.
Figure 14:
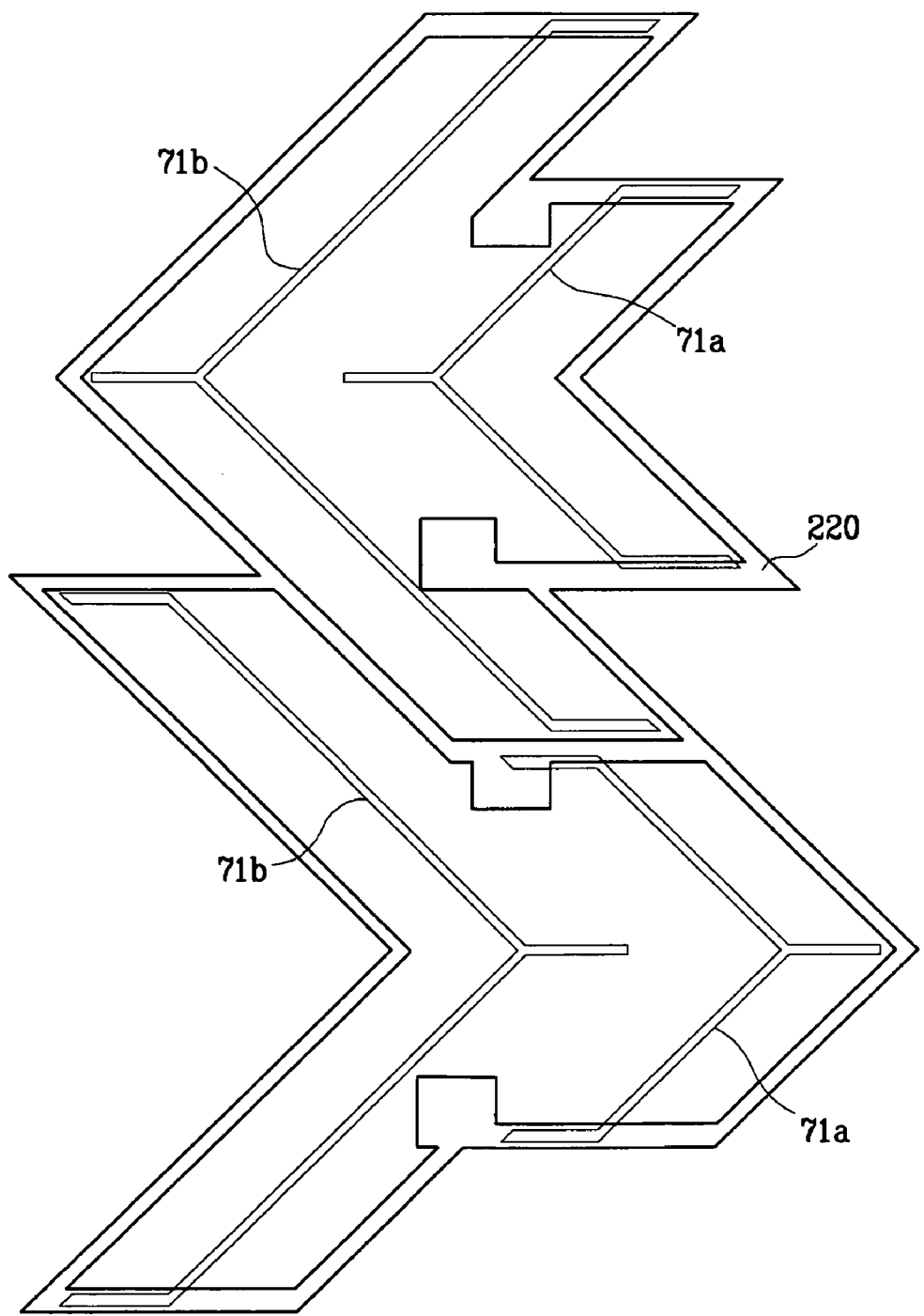
FIG. 14 is a layout view of an upper panel for an LC panel assembly according to an exemplary embodiment of the present invention.
Figure 15:
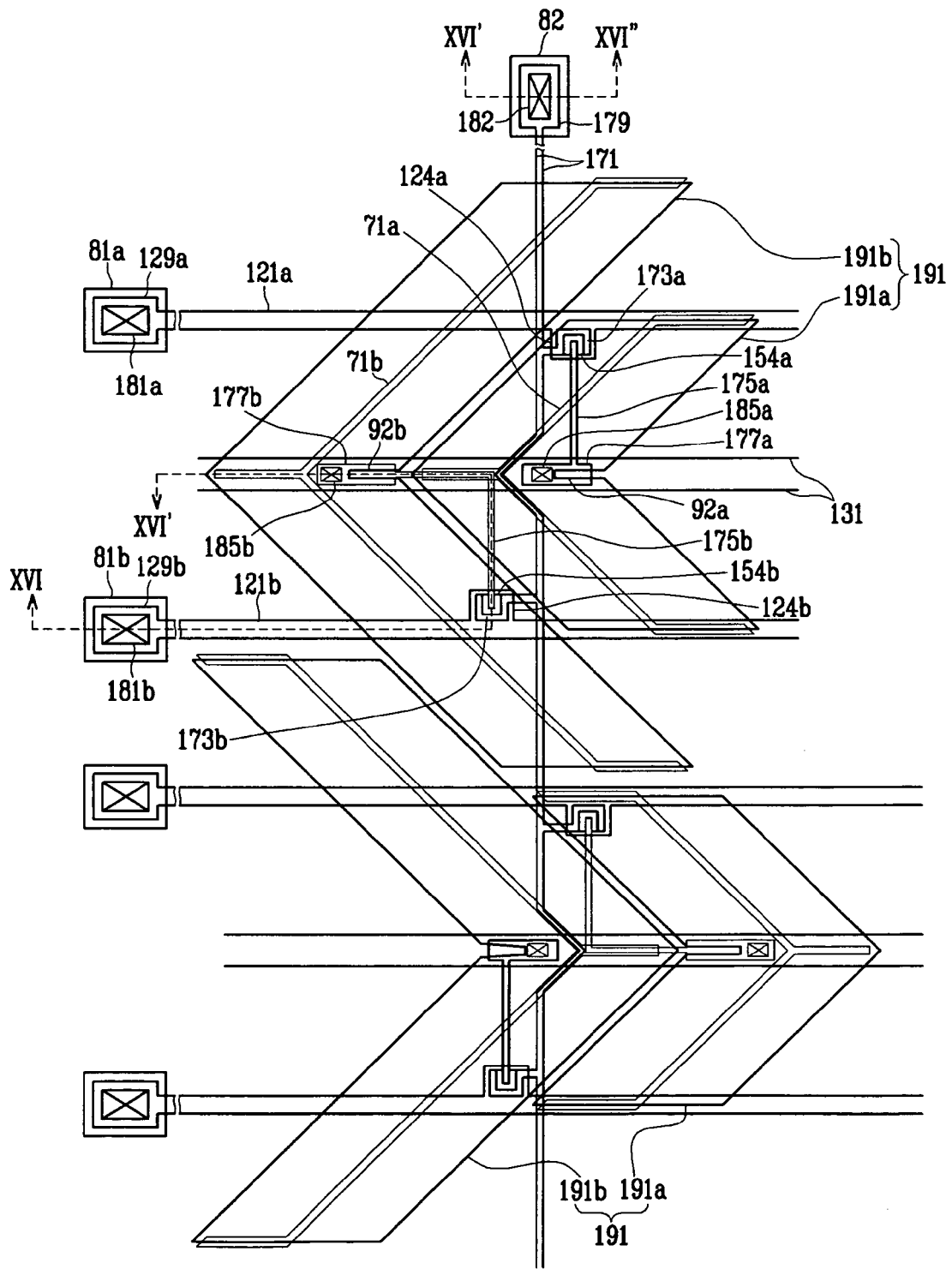
FIG. 15 is a layout view of an LC panel assembly including the lower panel shown in FIG. 13 and the upper panel shown in FIG. 14.
Figure 16:
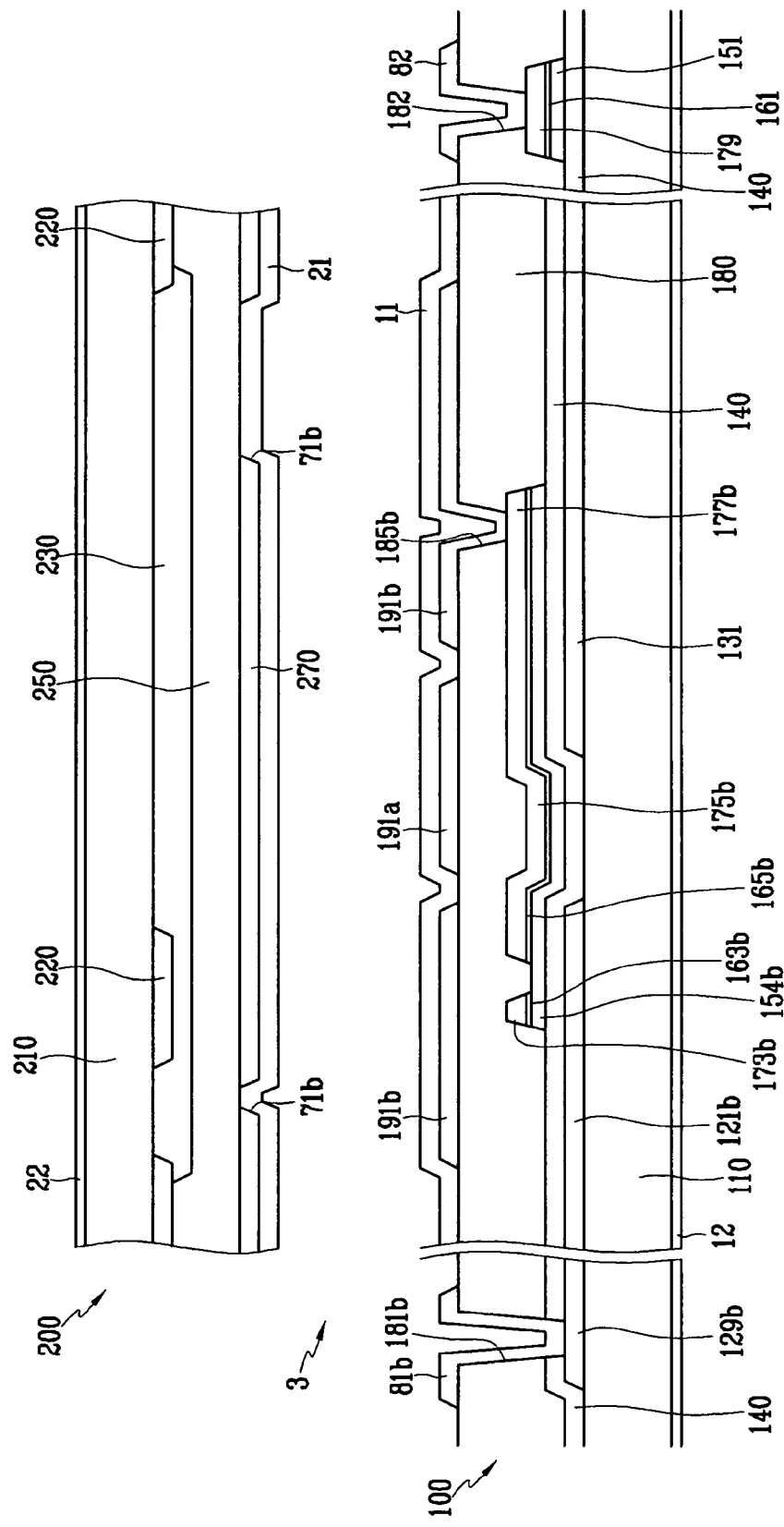
FIG. 16 is a sectional view of the LC panel assembly shown in FIG. 15 taken along lines XVI-XVI'-XVI".

FIG. 13 is a layout view of a lower panel for an LC panel assembly according to an exemplary embodiment of the present invention, FIG. 14 is a layout view of an upper panel for an LC panel assembly according to another embodiment of the present invention, FIG. 15 is a layout view of an LC panel assembly including the lower panel shown in FIG. 13 and the upper panel shown in FIG. 14, and FIG. 16 is a sectional view of the LC panel assembly shown in FIG. 15 taken along lines XVI-XVI'-XVI".

Referring to FIGS. 13-16, an LC panel assembly according to this exemplary embodiment includes a lower panel 100, an upper panel 200 facing the lower panel 100, an LC layer 3, and a pair of polarizers 12 and 22.

Layered structures of the LC panel assembly according to this embodiment are similar to those shown in FIGS. 8-11.

Regarding the lower panel 100, gate conductors including a plurality of first and second gate lines 121a and 121b and a plurality of storage electrode lines 131 are formed on a substrate 110. The first and the second gate lines 121a and 121b include first and second gate electrodes 124a and 124b and end portions 129a and 129b, respectively. A gate insulating layer 140, a plurality of semiconductor members 154a and 154b, and a plurality of ohmic contacts 163b and 165b are sequentially formed on the first and second gate lines 121a, 121b and the storage electrode lines 131. Data conductors including a plurality of data lines 171 and a plurality of first and second drain electrodes 175a and 175b are formed on the ohmic contacts 163b and 165b. The data lines 171 include first and second source electrodes 173a and 173b and end portions 179, and the drain electrodes 175a and 175b include wide end portions 177a and 177b. A passivation layer 180 is formed on the data conductors 171, 175a and 175b, the gate insulating layer 140, and exposed portions of the semiconductor members 154a and 154b. A plurality of contact holes 181a, 181b, 182, 185a and 185b are provided at the passivation layer 180 and the gate insulating layer 140. A plurality of pixel electrodes 191 including subpixel electrodes 191a and 191b and having cutouts 92a and 92b and a plurality of contact assistants 81a, 81b and 82 are formed on the passivation layer 180, and an alignment layer 11 is formed thereon.

Regarding the upper panel 200, a light blocking member 220, a plurality of color filters 230, an overcoat 250, a common electrode 270 having a plurality of cutouts 71a and 71b, and an alignment layer 21 are formed on an insulating substrate 210.

Unlike the LC panel assembly shown in FIGS. 8-11, the arrangement of the pixel electrodes 191 and the subpixel electrodes 191a and 191b is substantially the same that shown in FIG. 4. As described above, the pixel electrodes 191 adjacent in the column direction shown in FIG. 3 form a straighter line than those shown in FIG. 3, and, thus, the configuration shown in FIGS. 13-16 is more advantageous in displaying a longitudinal line as compared with that shown in FIGS. 8-11.

The data lines pass through about the center of a first or a second subpixel electrode 191a or 191b. In particular, bent portions of the data lines 171 overlap the cutouts 71a and 71b of the common electrode 270 instead of extending along the boundaries of the pixel electrodes 191, and this configuration also gives substantially the same advantage as that in a case where the data lines 171 extend along the boundaries of the pixel electrodes 191.

First/Second TFTs Qa/Qb are disposed right/left to the data lines 171. This configuration shortens the length of the second drain electrodes 175b as compared with that shown in FIGS. 8-12 to further increase the aperture ratio.

In addition, the semiconductor members 154a and 154b extend along the data lines 171 and the drain electrodes 175a and 175b to form semiconductor stripes 151, and the ohmic contacts 163b extend along the data lines 171 to form ohmic contact stripes 161. The semiconductor stripes 151 have almost the same planar shapes as the data conductors 171, 175a and 175b as well as the underlying ohmic contacts 161 and 165b.

A manufacturing method of the lower panel according to an exemplary embodiment of the present invention simultaneously forms the data conductors 171, 175a and 175b, the semiconductor members 151, and the ohmic contacts 161 and 165b using one photolithography process.

A photoresist pattern for the photolithography process has a position-dependent thickness, and in particular, it has first and second portions with a decreased thickness. The first portions are located on wire areas that will be occupied by the data conductors 171, 175a and 175b and the second portions are located on channel areas of TFTs Qa and Qb.

The position-dependent thickness of the photoresist is obtained by several techniques, for example, by providing translucent areas on the exposure mask as well as light transmitting transparent areas and light blocking opaque areas. The translucent areas may have a slit pattern, a lattice pattern, or a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask with transparent areas and opaque areas, it is subject to reflow process to flow onto areas without the photoresist, thereby forming thin portions.

As a result, the manufacturing process is simplified by omitting a photolithography step.

Many of the above-described features of the LC panel assembly shown in FIGS. 8-11 may be applicable to the LC panel assembly shown in FIGS. 13-16.

A structure of an LC panel assembly according to an exemplary embodiment of the present invention will be described in detail with reference to FIGS. 17 and 18 as well as FIGS. 1, 2 and 4.

Figure 17:
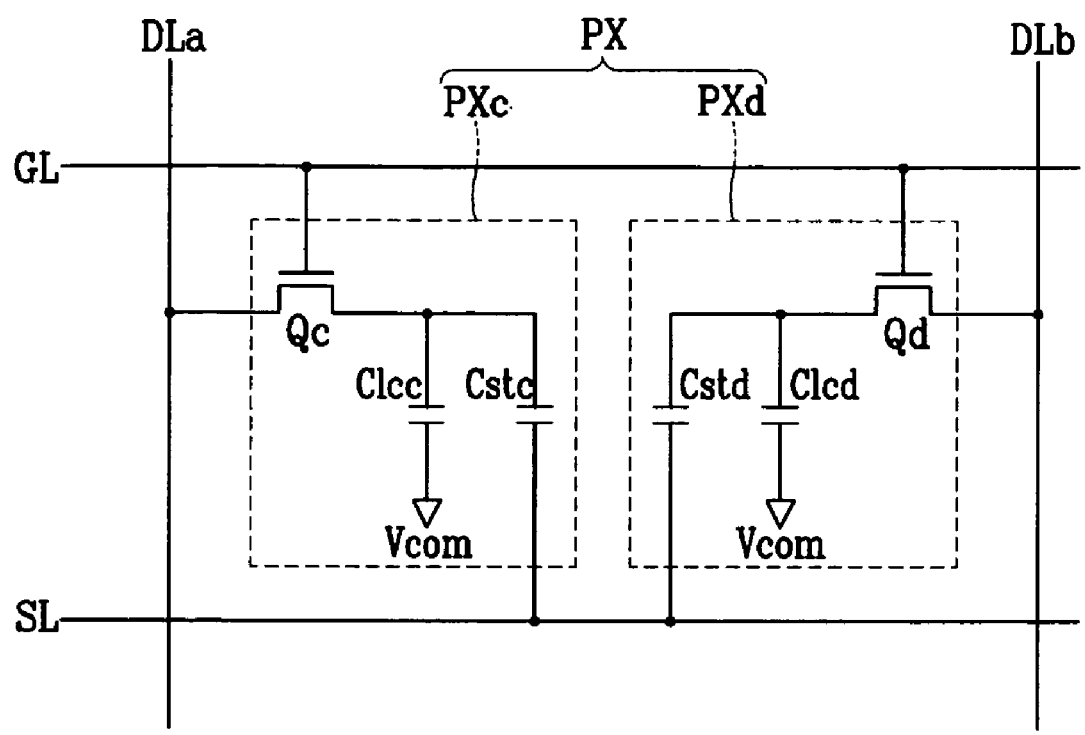
FIG. 17 is an equivalent circuit diagram of signal lines and a pixel according to an exemplary embodiment of the present invention.

FIG. 17 is an equivalent circuit diagram of signal lines and a pixel according to an exemplary embodiment of the present invention.

The LC panel assembly shown in FIG. 17 includes a plurality of signal lines and a plurality of pixels PX connected thereto. The signal lines include a plurality of gate lines GL, a plurality of pairs of data lines DLa and DLb, and a plurality of storage electrode lines SL.

Each pixel PX includes a pair of subpixels PXc and PXd. Each subpixel PXc/PXd includes a switching element Qc/Qd connected to one of the gate lines GL and one of the data lines DLa and DLb, an LC capacitor Clcc/Clcd coupled to the switching element Qc/Qd, and a storage capacitor Cstc/Cstd connected between the switching element Qc/Qd and the storage electrode line SL.

The switching element Qc/Qd such as a thin film transistor (TFT) is provided on the lower panel 100 and has three terminals: a control terminal connected to a gate line GL; an input terminal connected to a data line DLa/DLb; and an output terminal connected to the LC capacitor Clcc/Clcd.

Since the LC capacitor Clcc/Clcd, the storage capacitors Cstc and Cstd, and the operation of the LCD including the panel assembly shown in FIG. 17, etc., are substantially the same as those described above, a detailed description thereof will be omitted.

However, it is noted that the two pixels PXc and PXd forming a pixel PX shown in FIG. 17 are supplied with data voltages at the same time unlike those shown in FIG. 7. An example of an LC panel assembly shown in FIG. 17 according to an exemplary embodiment of the present invention will be described in detail with reference to FIG. 18.

Figure 18:
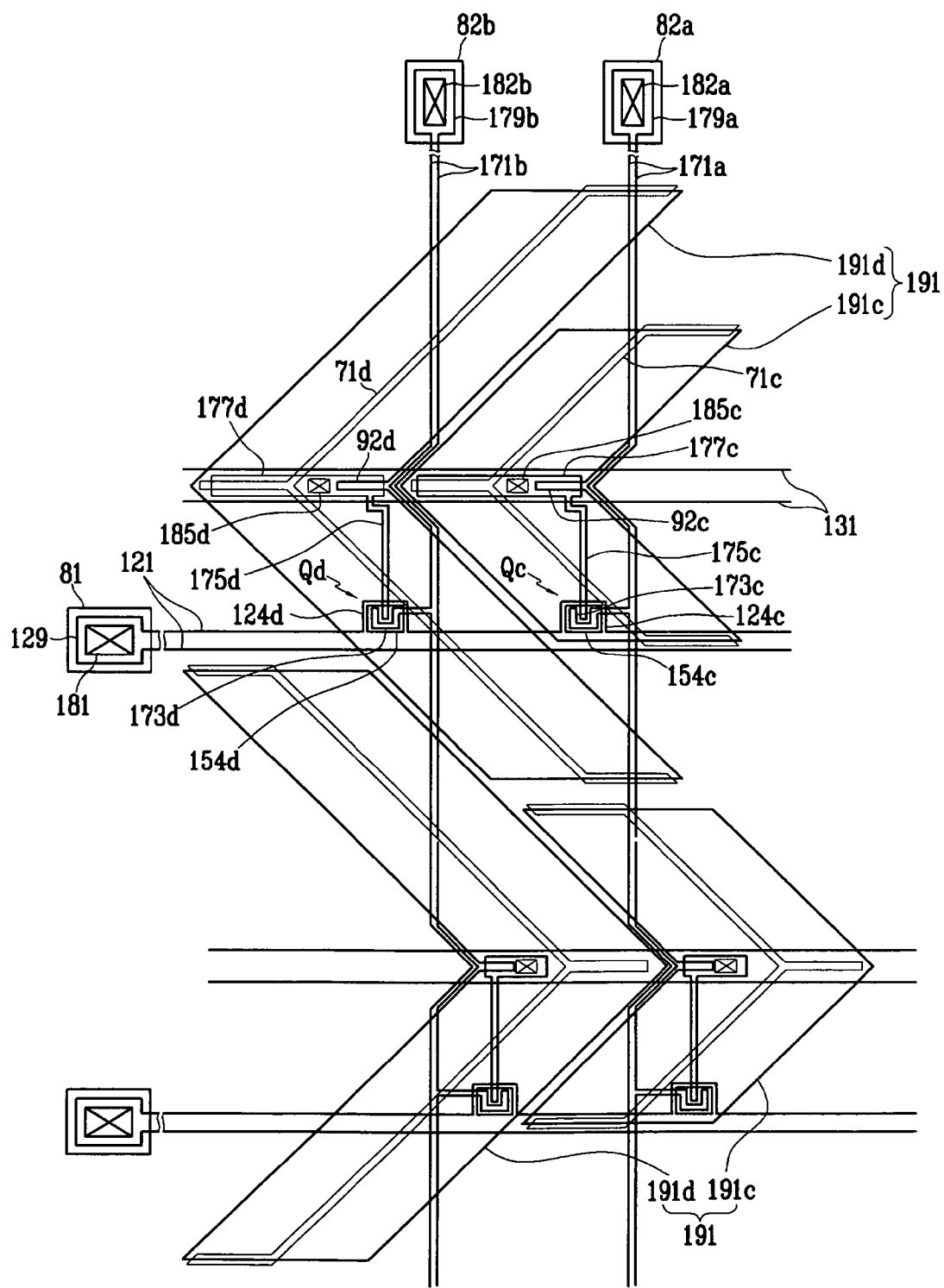
FIG. 18 is a layout view of an LC panel assembly according to an exemplary embodiment of the present invention.

FIG. 18 is a layout view of an LC panel assembly according to an embodiment of the present invention.

Referring to FIG. 18, an LC panel assembly according to an exemplary embodiment of the present invention includes a lower panel (not shown), an upper panel (not shown) facing the lower panel, and an LC layer (not shown).

Layered structures of the LC panel assembly according to this embodiment are almost the same as those shown in FIGS. 13-16.

Regarding the lower panel, gate conductors including a plurality of gate lines 121 and a plurality of storage electrode lines 131 are formed on a substrate (not shown). Each of the gate lines 121 includes first and second gate electrodes 124c 124d and an end portion 129. A gate insulating layer (not shown) is formed on the gate conductors 121 and the storage electrode lines 131, and a plurality of pairs of semiconductor islands 154c and 154d are formed on the gate insulating layer. A plurality of ohmic contacts (not shown) are formed on the semiconductor islands 154c and 154d. Data conductors including a plurality of pairs of first and second data lines 171a and 171b and a plurality of pair of first and second drain electrodes 175c and 175d are formed on the ohmic contacts and the gate insulating layer. Each of the first/second data lines 171a/171b includes a plurality of first/second source electrodes 173c/173d and an end portion 179a/179b. Each of the first/second drain electrode 175c/175d includes a wide end portion 177c/177d. A passivation layer (not shown) is formed on the data conductors 171a, 171b, 175c and 175d, the gate insulating layer, and exposed portions of the semiconductor islands 154c and 154d. A plurality of contact holes 181, 182a, 182b, 185c and 185d are provided at the passivation layer and the gate insulating layer. A pixel electrode 191 including first and second subpixel electrodes 191c and 191d and a plurality of contact assistants 81, 82a and 82b are formed on the passivation layer. The first subpixel electrode 191c has a cutout 92c, and the second subpixel electrode 191d has a cutout 92d. An alignment layer (not shown) is formed on the pixel electrodes 191 and the passivation layer.

Regarding the upper panel, a light blocking member. (not shown), a color filter (not shown), an overcoat (not shown), a common electrode (not shown) having a plurality of cutouts 71c and 72d, and an alignment layer (not shown)are formed on an insulating substrate (not shown).

However, the number of the gate lines 121 in the LC panel assembly shown in FIG. 18 is half that in the LC panel assembly shown in FIGS. 13-16, and the number of the data lines 171a and 171b in the LC panel assembly shown in FIG. 18 is twice that in the LC panel assembly shown in FIGS. 13-16. Furthermore, first and second TFTs Qc and Qd coupled to first and second subpixel electrodes 191c and 191d forming a pixel electrode 191 are connected to the same gate line 121 and different data lines 171a and 171b.

Curved portions of the data lines 171a and 171b are disposed near the boundaries between the first subpixel electrodes 191c and the second subpixel electrodes 191d. The first and the second TFTs Qc and Qd are disposed to the left of the first and the second data lines 171a and 171b, respectively.

Many of the above-described features of the LC panel assembly shown in FIGS. 13-16 may be applicable to the LC panel assembly shown in FIG. 18.

Now, structures of LC panel assemblies according to exemplary embodiments of the present invention will be described in detail with reference to FIGS. 19, 20, 21, 22 and 23 as well as FIGS. 1-3.

Figure 19:
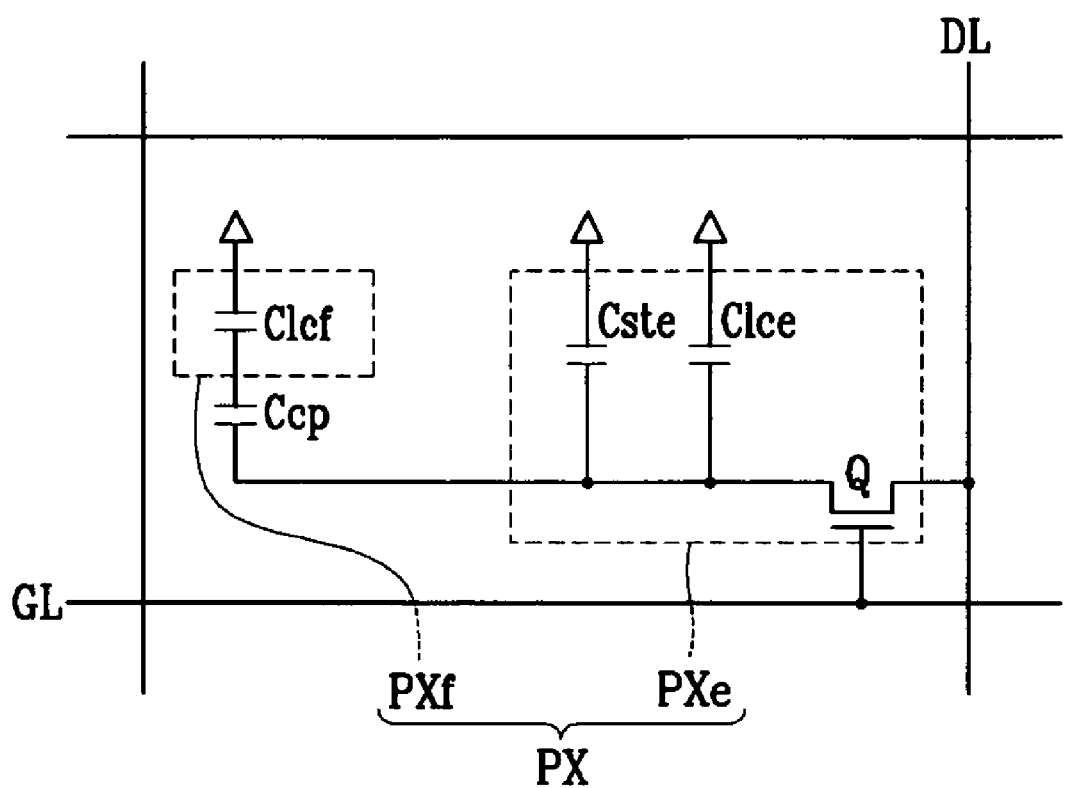
FIG. 19 is an equivalent circuit diagram of signal lines and a pixel according to an exemplary embodiment of the present invention.

FIG. 19 is an equivalent circuit diagram of the signal lines and a pixel PX according to an exemplary embodiment of the present invention.

The LC panel assembly shown in FIG. 19 includes a plurality of signal lines and a plurality of pixels PX connected thereto. The signal lines include a plurality of gate lines GL and a plurality of data lines DL.

Each pixel PX includes a pair of first and second subpixels PXe and PXf and a coupling capacitor Ccp connected between the first subpixel PXe and the second subpixel PXf.

The first subpixel PXe includes a switching element Q connected to one of the gate lines GL and one of the data lines DL, a first LC capacitor Clce coupled to the switching element Q, and a storage capacitor Cste connected to the switching element Q. The second subpixel PXf includes a second LC capacitor Clcb coupled to the coupling capacitor Ccp.

The switching element Q such as a thin film transistor (TFT) is provided on the lower panel 100 and has three terminals: a control terminal connected to a gate line GL; an input terminal connected to a data line DL; and an output terminal connected to the LC capacitor Clce, the storage capacitor Cste, and the coupling capacitor Ccp.

The switching element Q transmits data voltages from the data line DL in response to gate signals from the gate line GL to the first LC capacitor Clce and the coupling capacitor Ccp, and the coupling capacitor Ccp coverts the magnitude of the data voltage and supplied to the second LC capacitor Clcf.

It is assumed that the common voltage Vcom is applied to the storage capacitor Cste and the capacitor Clce, Cste, Clcf or Ccp and the capacitance thereof are denoted by the same numerals, a voltage Ve stored in the first LC capacitor Clce and a voltage Vf stored in the second LC capacitor Clcf satisfies:

$$Vf=Ve \times [Ccp/(Ccp+Clcf)].$$

Since Ccp/(Ccp+Clcf) is smaller than one, the voltage Vf stored in the second LC capacitor Clcf is smaller than the voltage Ve stored in the first LC capacitor Clce. The relation is also satisfied even though the voltage applied to the storage capacitor Cste is not the common voltage Vcom.

The desired ratio of the voltages Ve and Vf can be obtained by adjusting the capacitance of the coupling capacitor Ccp.

An example of an LC panel assembly shown in FIG. 19 according to an exemplary embodiment of the present invention will be described in detail with reference to FIGS. 20 and 21.

Figure 20:
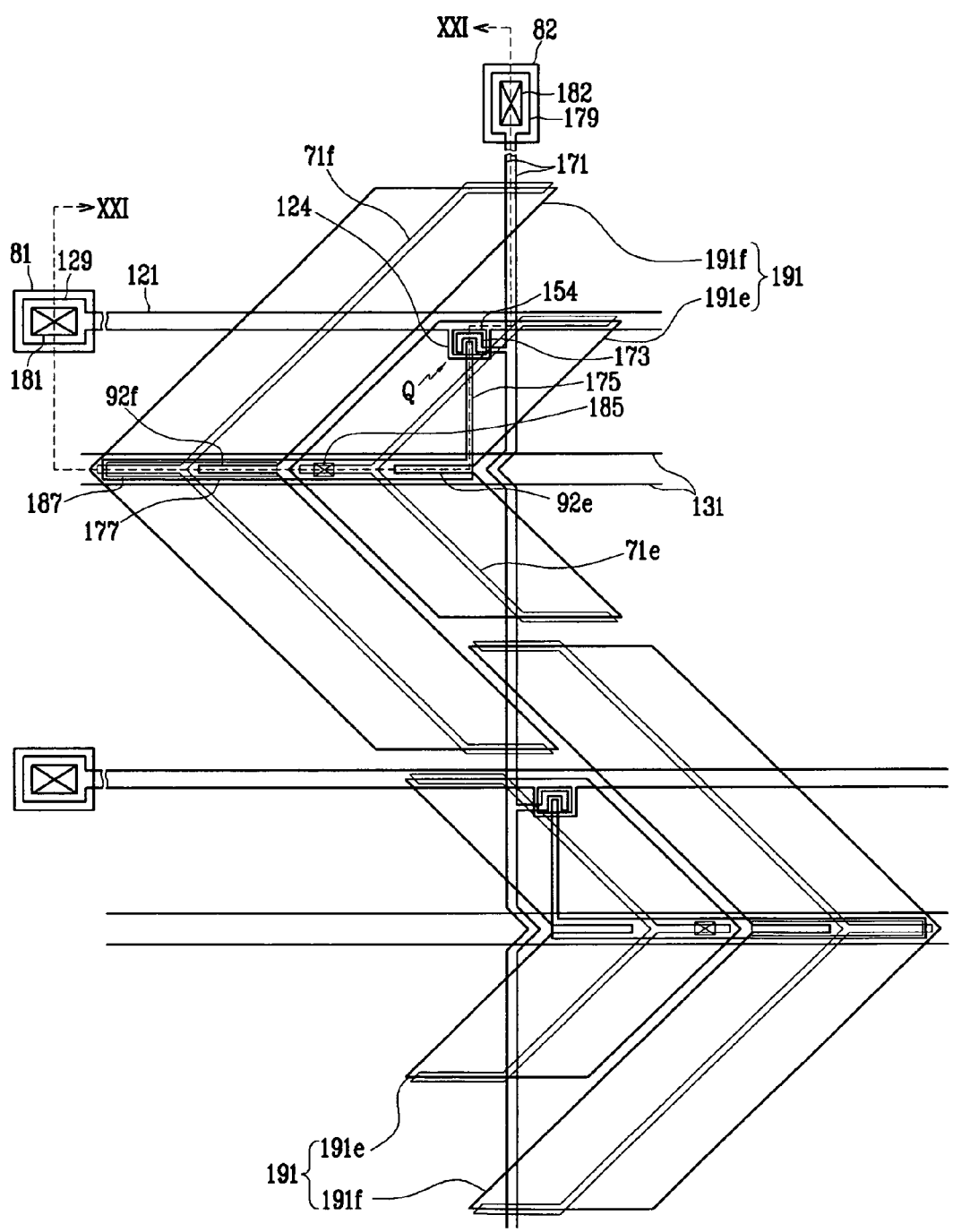
FIG. 20 is a layout view of an LC panel assembly according to an exemplary embodiment of the present invention.
Figure 21:
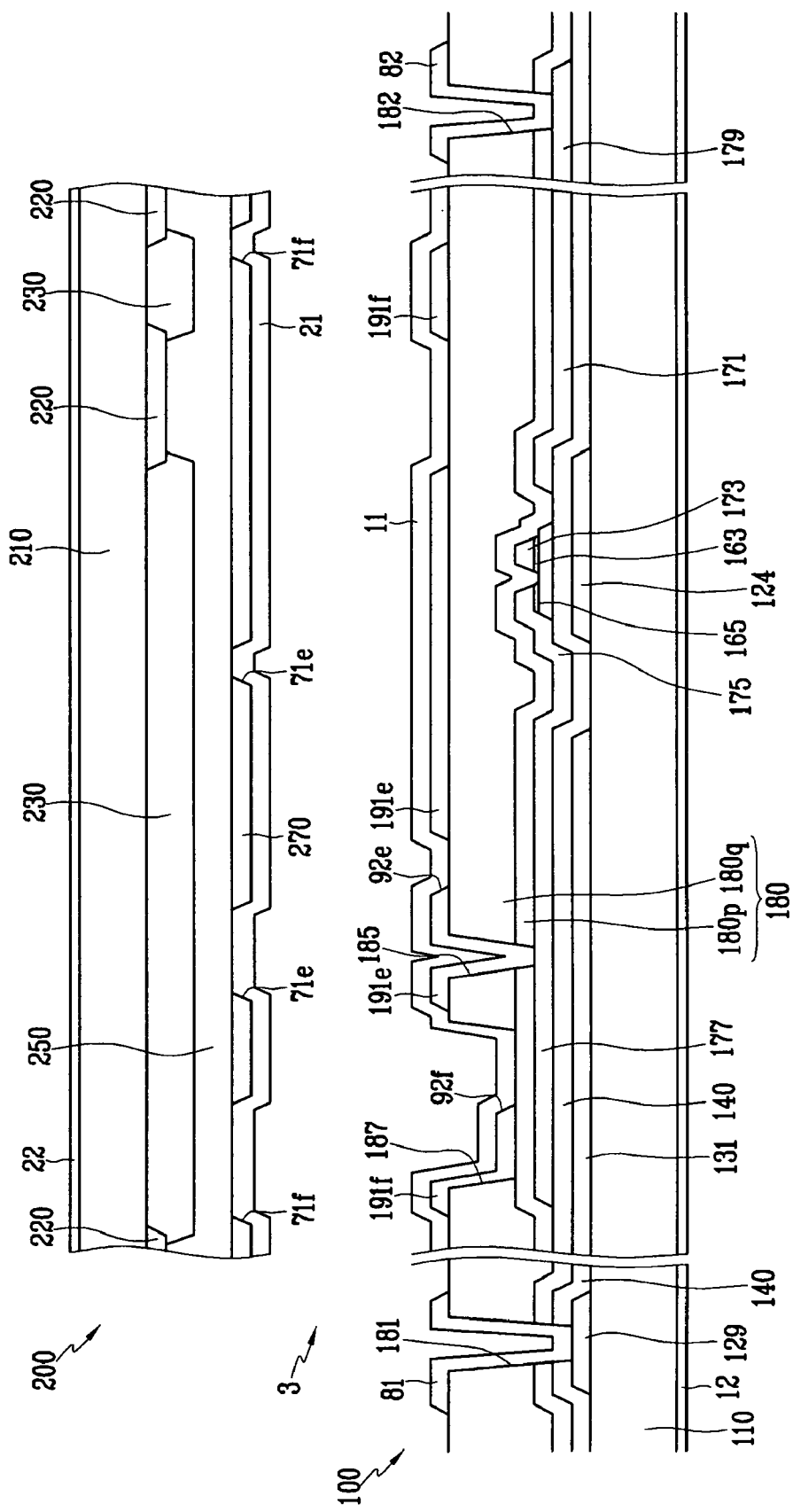
FIG. 21 is a sectional view of the LC panel assembly shown in FIG. 20 taken along line XXI-XXI.

FIG. 20 is a layout view of an LC panel assembly according to an exemplary embodiment of the present invention, and FIG. 21 is a sectional view of the LC panel assembly shown in FIG. 20 taken along line XXI-XXI.

An LC panel assembly includes a lower panel 100, an upper panel 200 facing the lower panel 100, a liquid crystal layer 3, and a pair of polarizers 12 and 22.

Layered structures of the LC panel assembly according to these embodiments are almost the same as those shown in FIGS. 8-11.

Regarding the lower panel 100, a plurality of gate lines 121 and a plurality of storage electrode lines 131 are formed on a substrate 110. Each of the gate lines 121 includes a plurality of gate electrodes 124 and an end portion 129. A gate insulating layer 140, a plurality of semiconductor islands 154, and a plurality of pairs of ohmic contacts 163 and 165 are sequentially formed on the gate lines 121. Data conductors including a plurality of data lines 171 and a plurality of drain electrodes 175 are formed on the ohmic contacts 163 and 165 and the gate insulating layer 140. Each of the data lines 171 includes a plurality of source electrodes 173 and an end portion 179, and each of the drain electrodes 175 includes an expansion 177. A passivation layer 180 is formed on the data conductors 171 and 175, the gate insulating layer 140, and exposed portions of the semiconductor islands 154. A plurality of contact holes 181, 182 and 185 are provided at the passivation layer 180 and the gate insulating layer 140. A plurality of pixel electrodes 191 including subpixel electrodes 191e and 191f having cutouts 92e and 92f are formed on the passivation layer 180. An alignment layer 11 is formed on the pixel electrodes 191 and the passivation layer 180.

Regarding the upper panel 200, a light blocking member 220, a plurality of color filters 230, an overcoat 250, a common electrode 270 having cutouts 71e and 71f, and an alignment layer 21 are formed on an insulating substrate 210.

Unlike the LC panel assembly shown in FIGS. 8-11, the second subpixel electrodes 191f are electrically floating, while the first subpixel electrodes 191e are connected to the drain electrodes 175.

Instead, each of the expansions 177 of the drain electrodes 175 extends along a storage electrode line 131 under a second subpixel electrode 191f to overlap the second subpixel electrode 191f. Therefore, the first subpixel electrode 191e and the second subpixel electrode 191f are capacitively coupled to each other to form a coupling capacitor Ccp.

The passivation layer 180 includes a lower film 180p and an upper film 180q. The lower film 180p may be made of an inorganic insulator such as silicon nitride or silicon oxide, and the upper film 180q may be made of an organic insulator. The organic insulator may have photosensitivity and a dielectric constant less than about 4.0 and may provide a flat surface. The passivation layer 180 may have a single layer structure that may be made of inorganic or organic insulator.

The upper film 180q has a plurality of openings 187 exposing the lower film 180p and disposed on the expansions 177 of the drain electrodes 175 under the second subpixel electrodes 191f. Therefore, the second subpixel electrodes 191f overlap the expansions 177 in the openings 187 with only the lower film 180p being interposed and, thus, the capacitance of the coupling capacitors Ccp is large as compared with a structure interposing both the lower film 180q and the upper film 180p, thereby increasing the aperture ratio.

Many of the above-described features of the LC panel assembly shown in FIGS. 8-11 may be applicable to the LC panel assembly shown in FIGS. 20 and 21.

Another example of an LC panel assembly shown in FIG. 19 according to an exemplary embodiment of the present invention will be described in detail with reference to FIGS. 22 and 23.

Figure 22:
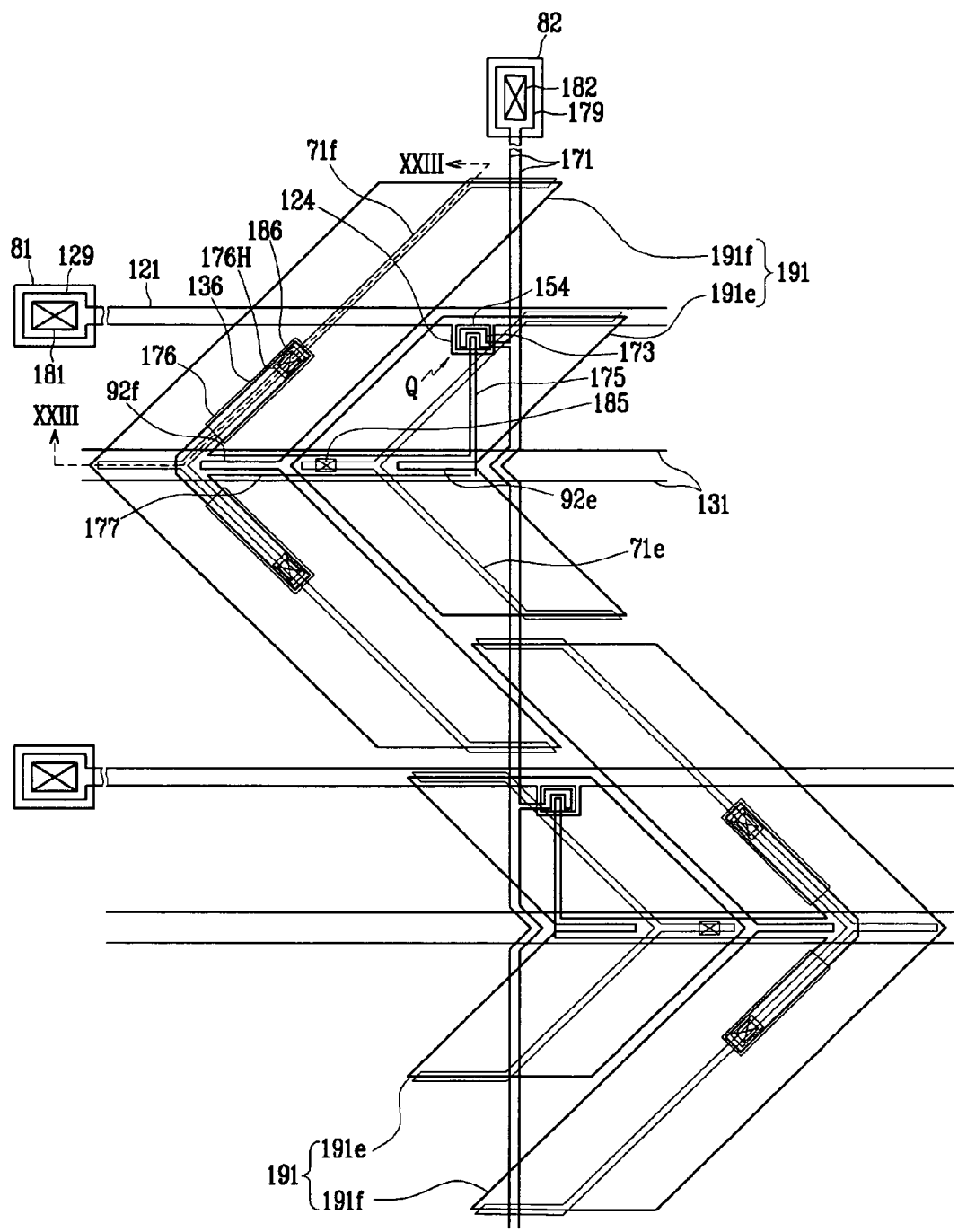
FIG. 22 is a layout view of an LC panel assembly according to an exemplary embodiment of the present invention.
Figure 23:
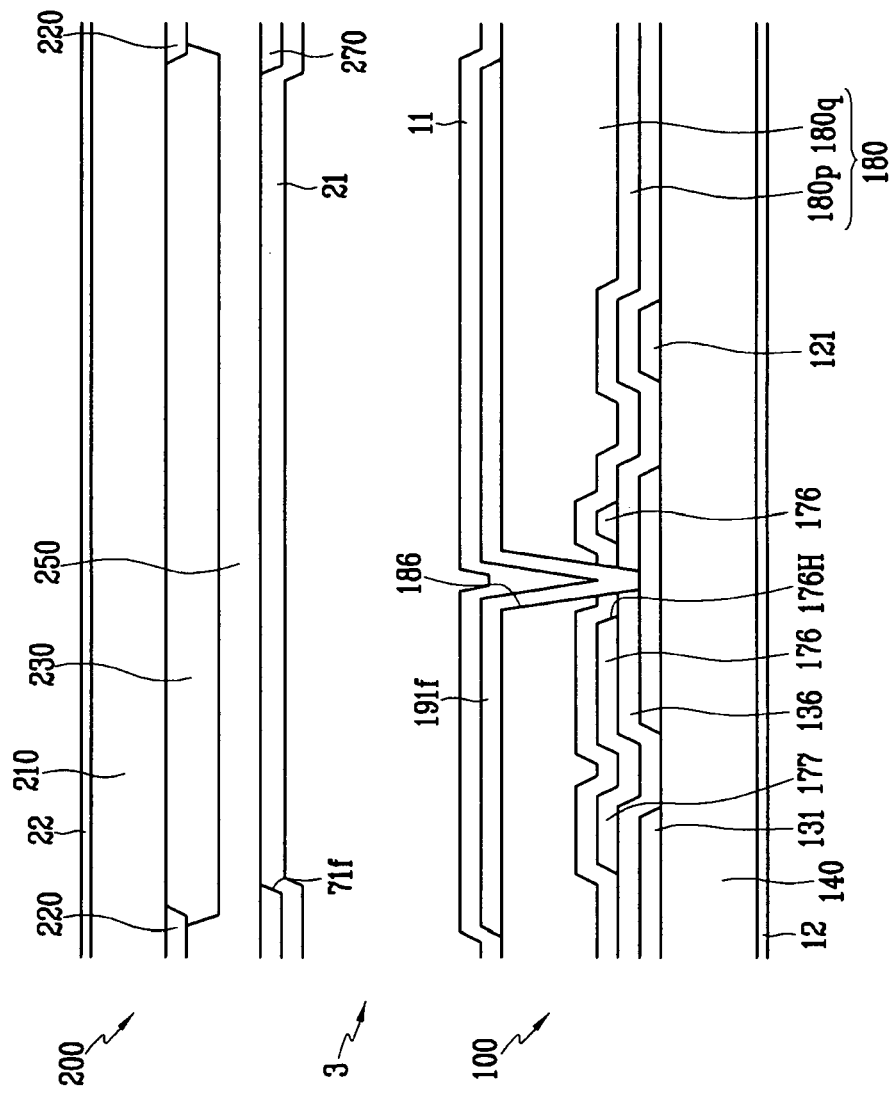
FIG. 23 is a sectional view of the LC panel assembly shown in FIG. 22 taken along line XXIII-XXIII.

FIG. 22 is a layout view of an LC panel assembly according to an exemplary embodiment of the present invention, and FIG. 23 is a sectional view of the LC panel assembly shown in FIG. 22 taken along line XXIII-XXIII.

An LC panel assembly includes a lower panel 100, an upper panel 200 facing the lower panel 100, a liquid crystal layer 3, and a pair of polarizers 12 and 22.

Layered structures of the LC panel assembly according to these embodiments are almost the same as those shown in FIGS. 20 and 21.

Regarding the lower panel 100, a plurality of gate lines 121 and a plurality of storage electrode lines 131 are formed on a substrate 110. Each of the gate lines 121 includes a plurality of gate electrodes 124 and an end portion 129. A gate insulating layer 140, a plurality of semiconductor islands 154, and a plurality of pairs of ohmic contacts (not shown) are sequentially formed on the gate lines 121. Data conductors including a plurality of data lines 171 and a plurality of drain electrodes 175 are formed on the ohmic contacts and the gate insulating layer 140. Each of the data lines 171 includes a plurality of source electrodes 173 and an end portion 179. A passivation layer 180 including a lower film 180p and an upper film 180q is formed on the data conductors 171 and 175, the gate insulating layer 140, and exposed portions of the semiconductor islands 154. A plurality of contact holes 181, 182, 185 and 186 are provided at the passivation layer 180 and the gate insulating layer 140. A plurality of pixel electrodes 191 including subpixel electrodes 191e and 191f having cutouts 92e and 92f are formed on the passivation layer 180. An alignment layer 11 is formed on the pixel electrodes 191 and the passivation layer 180.

Regarding the upper panel 200, a light blocking member 220, a plurality of color filters 230, an overcoat 250, a common electrode 270 having cutouts 71e and 71f, and an alignment layer 21 are formed on an insulating substrate 210.

Unlike the LC panel assembly shown in FIGS. 20 and 21, a plurality of pairs of capacitive electrodes 136 are formed on the substrate 110. The capacitive electrodes 136 are made of the same layer as the gate lines 121 and the storage electrode lines 131 and are spaced apart from the gate lines 121 and the storage electrode lines 131. A pair of the capacitive electrodes 136 are symmetrically arranged with respect to a storage electrode line 131 and extend along a cutout 71f of the common electrode 270. The capacitive electrodes 136 are connected to the second subpixel electrodes 191f through the contact holes 186.

Each of the drain electrodes 175 includes an expansion 177 and a pair of branches 176 branching from the expansion 177. The expansion 177 extends along a storage electrode line 131 to a bent point of a cutout 71f, and the branches extend from an end of the expansion 177 along a pair of capacitive electrodes 136 to overlap the capacitive electrodes 136. The branches 176 have a plurality of through holes 176H larger than the contact holes 186 so that the contact holes 186 may pass through the through holes 176H.

The branches 176 and the capacitive electrodes 136 form a coupling capacitor Ccp, and a second subpixel electrode 191f and a portion of the expansion 177 disposed thereunder also contribute to the coupling capacitance.

Many of the above-described features of the LC panel assembly shown in FIGS. 20 and 21 may be applicable to the LC panel assembly shown in FIGS. 22 and 23.

As described above, the above-described exemplary embodiments of the present invention provide widths of the sub-areas suitable for various pixel sizes of the LCD. The exemplary embodiments give balanced color configuration and facilitate the display of longitudinal lines and oblique lines. In addition, the exemplary embodiments further improve the aperture ratio, the lateral visibility, and the reference viewing angle. While the present invention has been described in detail with reference to exemplary embodiments, those skilled in the art will appreciate that various modifications and substitutions can be made thereto without departing from the spirit and scope of the present invention as set forth in the appended claims.

What is claimed is:

1. A liquid crystal display comprising:
   a substrate;
   a pixel electrode disposed on the substrate and including a first subpixel electrode and a second subpixel electrode; and
   a common electrode facing the pixel electrode,
   wherein the first subpixel electrode has a pair of bent edges substantially parallel to each other,
   the second subpixel electrode has a pair of bent edges substantially parallel to each other, and
   the second subpixel electrode has a height greater than a height of the first subpixel electrode,
   wherein a convexity and a concavity of the bent edges of the first and the second subpixel electrodes are reversed relative to each other.

2. The liquid crystal display of claim 1, wherein the first subpixel electrode and the second subpixel electrode are adjacent in a length direction.

3. The liquid crystal display of claim 1, wherein the first subpixel electrode and the second subpixel electrode are adjacent in a height direction.

4. The liquid crystal display of claim 1, wherein the first subpixel electrode has a length substantially equal to a length of the second subpixel electrode.

5. The liquid crystal display of claim 4, wherein the height of the second subpixel electrode is about twice the height of the first subpixel electrode.

6. The liquid crystal display of claim 1, wherein each of the bent edges of the first and second subpixel electrodes has a bent point, and each of the first and the second subpixel electrodes has a symmetry with respect to a straight line connecting the bent points.

7. The liquid crystal display of claim 1, wherein each of the pairs of bent edges comprise a concave edge and a convex edge, and the convex edge of the first subpixel electrode is adjacent to the concave edge of the second subpixel electrode or the concave edge of the fltst subpixel electrode is adjacent the convex edge of the second subpixel electrode.

8. The liquid crystal display of claim 1, wherein each of the pairs of bent edges include a concave edge and a convex edge, the concave edge of the first subpixel electrode is connected to the convex edge of the second subpixel electrode, and the convex edge of the first subpixel electrode is connected to the concave edge of the second subpixel electrode.

* * * * *